US012406186B2

(12) United States Patent
Cassidy et al.

(10) Patent No.: US 12,406,186 B2
(45) Date of Patent: Sep. 2, 2025

(54) CONFLICT-FREE, STALL-FREE, BROADCAST NETWORK ON CHIP

(71) Applicant: INTERNATIONAL BUSINESS MACHINES CORPORATION, Armonk, NY (US)

(72) Inventors: Andrew Stephen Cassidy, San Jose, CA (US); Rathinakumar Appuswamy, San Jose, CA (US); John Vernon Arthur, Mountain View, CA (US); Jun Sawada, Austin, TX (US); Dharmendra S. Modha, San Jose, CA (US); Michael Vincent DeBole, Poughkeepsie, NY (US); Pallab Datta, San Jose, CA (US); Tapan Kumar Nayak, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1069 days.

(21) Appl. No.: 17/076,287

(22) Filed: Oct. 21, 2020

(65) Prior Publication Data
US 2022/0121951 A1 Apr. 21, 2022

(51) Int. Cl.
G06N 3/045 (2023.01)
G06N 3/063 (2023.01)
G06N 3/084 (2023.01)

(52) U.S. Cl.
CPC ............. *G06N 3/084* (2013.01); *G06N 3/045* (2023.01); *G06N 3/063* (2013.01)

(58) Field of Classification Search
CPC ........ G06N 3/084; G06N 3/045; G06N 3/063; G06N 3/048
See application file for complete search history.

(56) References Cited

U.S. PATENT DOCUMENTS 7,533,244 B2 * 5/2009 Tran ..................... G06F 15/7825
712/24
9,111,151 B2 8/2015 Chen et al.
(Continued)

FOREIGN PATENT DOCUMENTS

AU 2021366095 A1 4/2023
BR 112023005145 A2 5/2023
(Continued)

OTHER PUBLICATIONS

Emery et al., "Connection-Centric Network for Spiking Neural Networks," 3rd ACM/IEEE International Symposium on Networks-on-Chip: 9 pages (2009).
(Continued)

*Primary Examiner* — Hien L Duong
(74) *Attorney, Agent, or Firm* — Zilka-Kotab, P.C.

(57) ABSTRACT

Conflict-free, stall-free, broadcast networks on neural inference chips are provided. In various embodiments, a neural inference chip comprises a plurality of network nodes and a network on chip interconnecting the plurality of network nodes. The network comprises at least one pair of directional paths. The paths of each pair have opposite directions and a common end. The network is configured to accept data at any of the plurality of nodes. The network is configured to propagate data along a first of the pair of directional paths from a source node to the common end of the pair of directional paths and along a second of the pair of directional paths from the common end of the pair of directional paths to one or more destination node.

21 Claims, 25 Drawing Sheets

(56) References Cited

U.S. PATENT DOCUMENTS

| | | | |
|---|---|---|---|
| 9,294,419 B2* | 3/2016 | Hasenplaugh | H04L 49/101 |
| 9,571,402 B2 | 2/2017 | Kumar et al. | |
| 9,924,490 B2* | 3/2018 | Alvarez Icaza Rivera | H04W 68/00 |
| 10,116,557 B2* | 10/2018 | Gray | H04L 45/60 |
| 10,187,064 B1* | 1/2019 | Atsatt | H03K 19/17792 |
| 10,268,605 B1 | 4/2019 | Perry | |
| 10,587,534 B2* | 3/2020 | Gray | H04L 12/18 |
| 10,608,640 B1* | 3/2020 | Orthner | G06F 13/4282 |
| 10,785,745 B2* | 9/2020 | Alvarez Icaza Rivera | G06N 3/049 |
| 11,294,850 B2* | 4/2022 | Ganesh | G06F 15/17381 |
| 11,461,617 B2 | 10/2022 | Nomura et al. | |
| 11,842,266 B2* | 12/2023 | Song | G06F 3/0658 |
| 2004/0039717 A1* | 2/2004 | Nugent | B82Y 10/00 977/839 |
| 2008/0123666 A1 | 5/2008 | Ciordas et al. | |
| 2008/0232387 A1* | 9/2008 | Rijpkema | H04L 45/00 370/461 |
| 2015/0003281 A1* | 1/2015 | Hasenplaugh | H04L 49/101 370/254 |
| 2015/0043575 A1* | 2/2015 | Kumar | H04L 12/185 370/390 |
| 2016/0224889 A1* | 8/2016 | Alvarez Icaza Rivera | H04W 68/00 |
| 2016/0344629 A1* | 11/2016 | Gray | H04L 49/106 |
| 2017/0220499 A1* | 8/2017 | Gray | G06F 13/36 |
| 2018/0046906 A1 | 2/2018 | Dally et al. | |
| 2018/0189645 A1 | 7/2018 | Chen et al. | |
| 2019/0131975 A1 | 5/2019 | Raghava et al. | |
| 2019/0260504 A1* | 8/2019 | Philip | H04L 1/0041 |
| 2019/0266089 A1* | 8/2019 | Kumar | G06F 12/0813 |
| 2019/0303741 A1* | 10/2019 | Appuswamy | G06N 3/063 |
| 2019/0332924 A1* | 10/2019 | Cassidy | G06N 3/063 |
| 2020/0117988 A1 | 4/2020 | Arthur et al. | |
| 2020/0356514 A1* | 11/2020 | Orthner | G06F 13/4068 |
| 2022/0094631 A1* | 3/2022 | Dutta | H04L 45/22 |
| 2022/0292399 A1* | 9/2022 | Roune | G06N 3/08 |
| 2023/0305991 A1* | 9/2023 | Knowles | G06F 15/17318 |

FOREIGN PATENT DOCUMENTS

| | | |
|---|---|---|
| CN | 116348890 A | 6/2023 |
| EP | 4232955 A1 | 8/2023 |
| JP | 2019-095861 A | 6/2019 |
| JP | 2023-546342 A | 11/2023 |
| KR | 10-2023-0060530 A | 5/2023 |
| WO | 2013/095664 A1 | 6/2013 |
| WO | 2022/083912 A1 | 4/2022 |

OTHER PUBLICATIONS

Faizal et al., "Runtime Contention and Bandwidth-Aware Adaptive Routing Selection Strategies for Networks-on-Chip," IEEE Transactions on Parallel and Distributed Systems, 24(7): 1411-1421 (2013).

International Search Report and Written Opinion for International Application No. PCT/EP2021/072329 dated Jan. 25, 2022.

Zimmer et al., "A 0.32-128 TOPS, Scalable Multi-Chip-Module-Based Deep Neural Network Inference Accelerator With Ground-Referenced Signaling in 16 nm," IEEE Journal of Solid-State Circuits, 55(4): 920-932 (2020).

Garg et al., "HopliteBuf: FPGA NoCs with Provably Stall-Free FIFOs," ACM: 10 pages (2019).

Examination Report for Australian Application No. 2021366095 dated Aug. 1, 2023.

Japan Patent Office, "Notice of Reasons for Refusal," Dec. 3, 2024, 6 Pages, JP Application No. 2023-519006.

Innovation, Science and Economic Development Canada, "Office Action," May 21, 2025, 4 Pages, CA Application No. 3187723.

Intellectual Property Office, "Notice of Allowance," Jul. 9, 2025, 10 Pages, KR Application No. 10-2023-7011221.

Japan Patent Office, "Notice of Reasons for Refusal" May 20, 2025, 07 Pages, JP Application No. 2023-519006.

* cited by examiner

| Signal Name | Width | Definition |
|---|---|---|
| addr_dist_mode_Y | 1 | 0 = Y direct address (absolute)<br>1 = Y distribution flag (multicast) addressing<br>(see Model NoC Addressing slide for usage) |
| addr_dist_mode_X | 1 | 0 = X direct address (absolute)<br>1 = X distribution flag (multicast) addressing<br>(see Model NoC Addressing slide for usage) |
| ext_out_transaction | 1 | 0 = array transaction<br>1 = external read transaction (data from array to external interface)<br>(see Model NoC External Interface slide for definition/usage) |
| ext_in_transaction | 1 | 0 = array transaction<br>1 = external write transaction (data from external interface to array)<br>(see Model NoC External Interface slide for definition/usage) |
| word_en | 4 | word enables (for 4X 256b words)<br>(see Unified Memory slides for usage) |
| addr_valid | 1 | valid address |
| addr | 10+<br>10+<br>21 | [40:31] = NS address (see Model NoC Addressing slide for definition)<br>[30:21] = EW address (see Model NoC Addressing slide for definition)<br>[20:0] = local core address |
| data_valid | 1 | valid data |
| data | 1024 | data |

FIG. 14

See: CORE_MNOC_CONFIG_REG

1501

| Field: | Reserved | Distr Row ID |
|---|---|---|
| Width: | 6 | 4 |
| Bits: | 9:4 | 3:0 |

1502

| Field: | Reserved | Distr Col ID |
|---|---|---|
| Width: | 6 | 4 |
| Bits: | 9:4 | 3:0 |

1503

| Field: | Boolean Neg | Any All Select | Distr Flags |
|---|---|---|---|
| Width: | 1 | 1 | 8 |
| Bits: | 9 | 8 | 7:0 |

| Boolean Neg | |
|---|---|
| 0 | Direct Boolean match expression (no negation) |
| 1 | Invert (negate) Boolean match expression |

| Any All SEL | |
|---|---|
| 0 | Any match expression |
| 1 | All match expression |

FIG. 15

| Entry | Exit | Path | Cycles |
|---|---|---|---|
| RX_West | TX_East | (Strait-through) | 1 |
| RX_West | Local Core I/F | X Addr match | 1 |
| RX_East | TX_West | (Strait-through) | 1 |
| RX_East | TX_East | West Loopback | 1 |
| RX_East | Local Core I/F | West Loopback → X Addr match | 1 |
| RX_North | TX_South | (Strait-through) | 1 |
| RX_Northt | TX_West | Y Addr match | 2 |
| RX_North | TX_East | Y Addr match → West Loopback | 2 |
| RX_North | Local Core I/F | Y Addr match → West Loopback → X Addr match | 2 |

FIG. 18A

| Entry | Exit | Path | Cycles |
|---|---|---|---|
| RX_South | TX_North | (Strait-through) | 1 |
| RX_South | TX_South | North Loopback | 1 |
| RX_South | TX_West | North Loopback → Y Addr match | 2 |
| RX_South | TX_East | North Loopback → Y Addr match → West Loopback | 2 |
| RX_South | Local Core I/F | North Loopback → Y Addr match → West Loopback → X Addr match | 2 |
| Local Core I/F | TX_North | (Strait-through) | 1 |
| Local Core I/F | TX_South | North Loopback | 1 |
| Local Core I/F | TX_West | North Loopback → Y Addr match | 2 |
| Local Core I/F | TX_East | North Loopback → Y Addr match → West Loopback | 2 |
| Local Core I/F (multicast) | Local Core I/F | North Loopback → Y Addr match → West Loopback → X Addr match | 2 |
| Local Core I/F (direct) | Local Core I/F | Local Core I/F (does not enter MNoC Router) | -- |

FIG. 18B

| Mode | Interface | Link Disable | Loopback | Data Transactions | External Transactions |
|---|---|---|---|---|---|
| Normal, interior | {N,S,E,W} TX, RX | 0 | 0 | pass | pass |
| Normal, top edge (row 0) | N TX | 0 | 1 | loopback | loopback |
| Normal, top edge | N RX | 0 | 1 | zero | pass |
| Normal, left edge (col 0) | W TX | 0 | 1 | loopback | ext_out: pass ext_in: loopback |
| Normal, left edge | W RX | 0 | 1 | zero | zero |
| Normal, bottom edge (row N-1) | S TX | 0 | -- | drop | drop |
| Normal, bottom edge | S RX | 0 | -- | zero | zero |
| Normal, right edge (col N-1) | E TX | 0 | -- | drop | drop |
| Normal, right edge | E RX | 0 | -- | zero | zero |
| Partition, interior | {N,S,E,W} TX, RX | 0 | 0 | pass | pass |
| Partition, top edge | N TX | 1 | 1 | loopback | pass |
| Partition, top edge | N RX | 1 | 1 | zero (drop) | pass |
| Partition, left edge | W TX | 1 | 1 | loopback | pass |
| Partition, left edge | W RX | 1 | 1 | zero (drop) | pass |
| Partition, bottom edge | S TX | 1 | -- | drop | pass |
| Partition, bottom edge | S RX | 1 | -- | zero (drop) | pass |
| Partition, right edge | E TX | 1 | -- | drop | pass |
| Partition, right edge | E RX | 1 | -- | zero (drop) | pass |

FIG. 21A

CONFLICT-FREE, STALL-FREE, BROADCAST NETWORK ON CHIP

STATEMENT REGARDING FEDERALLY SPONSORED RESEARCH OR DEVELOPMENT

This invention was made with government support under FA8750-18-C-0015 awarded by U.S. Air Force, Office of Scientific Research. The government has certain rights to this invention.

BACKGROUND

Embodiments of the present disclosure relate to neural network processing, and more specifically, to conflict-free, stall-free, broadcast network on a chip using a J-scheme.

BRIEF SUMMARY

According to embodiments of the present disclosure, neural inference chips are provided. In various embodiments, a neural inference chip comprises a plurality of network nodes and a network on chip interconnecting the plurality of network nodes. The network comprises at least one pair of directional paths. The paths of each pair have opposite directions and a common end. The network is configured to accept data at any of the plurality of nodes. The network is configured to propagate data along a first of the pair of directional paths from a source node to the common end of the pair of directional paths and along a second of the pair of directional paths from the common end of the pair of directional paths to one or more destination node.

According to embodiments of the present disclosure, methods of and computer program products for operating a network on chip are provided. Data are accepted at a plurality of network nodes. The plurality of network nodes is interconnected by a network on chip. The network comprises at least one pair of directional paths. The paths of each pair have opposite directions and a common end. Data are propagated along a first of the pair of directional paths from a source node to the common end of the pair of directional paths and along a second of the pair of directional paths from the common end of the pair of directional paths to one or more destination nodes.

BRIEF DESCRIPTION OF THE SEVERAL VIEWS OF THE DRAWINGS

FIG. 14 is a schematic view of a model network-on-chip (NOC) packet format, according to embodiments of the present disclosure.

FIG. 15 is a schematic view of a model network-on-chip (NOC) addressing configuration, according to embodiments of the present disclosure.

FIGS. 18A-B is a schematic view of a model network-on-chip (NOC) list of router paths, according to embodiments of the present disclosure.

FIGS. 20 and 21A-B are schematic views of a model network-on-chip (NOC) array logical partitioning, according to embodiments of the present disclosure.

DETAILED DESCRIPTION

Figure 1:
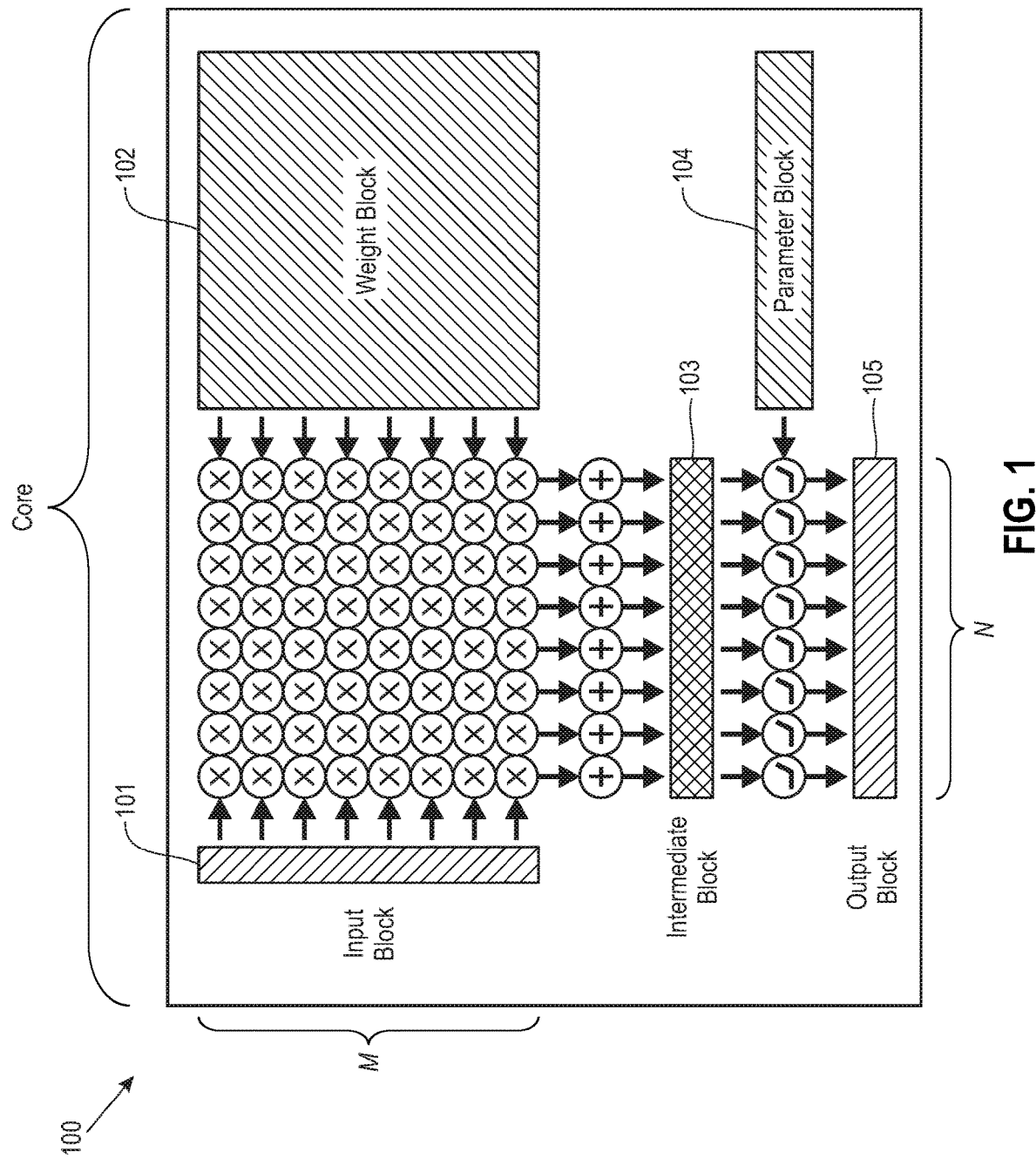
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ. In some embodiments, activation function σ requires no additional parameters, in which case the additional dimension is unnecessary. However, in some embodiments, activation function a requires at least one additional parameter, which appears in dimension o.

An element of a layer's output data tensor Y can be computed as in Equation 1 where the neuron activation function σ is configured by the vector of activation function parameters V[i,j,k,:], and the weighted sum Z[i,j,k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i,j,k]=σ(Z[i,j,k])=Z[i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are parallel structures. Neurons in a given layer receive inputs, X with elements $x_i$ from one or more layers or other inputs. Each neuron computes its state, y∈Y based on the inputs and weights W with elements $w_i$. In various embodiments, the weighed sum of inputs is adjusted by a bias b, and then the result is passed to a nonlinearity F(•). For example, a single neuron activation may be expressed as $y=F(b+\Sigma x_i w_i)$.

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
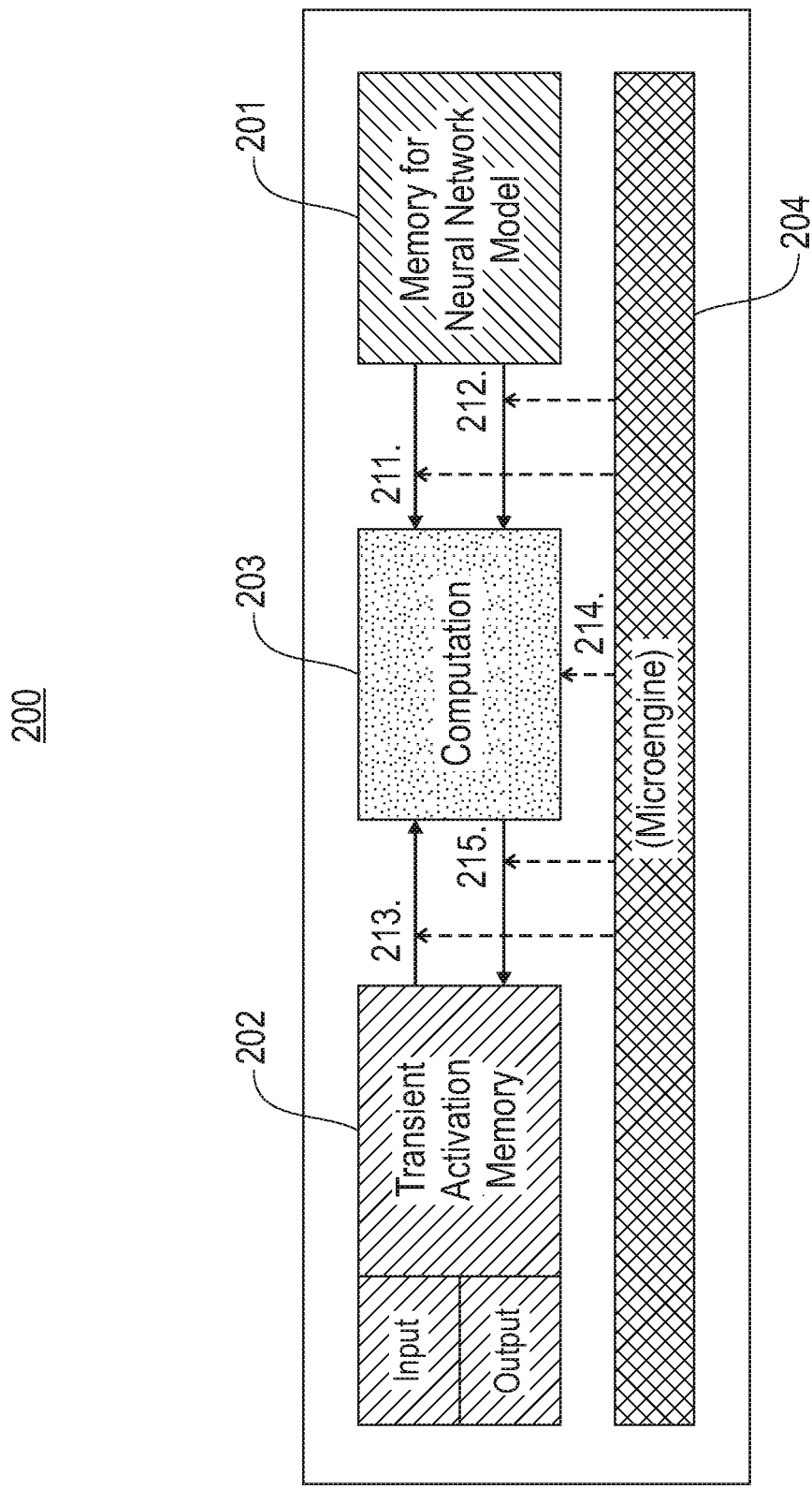
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
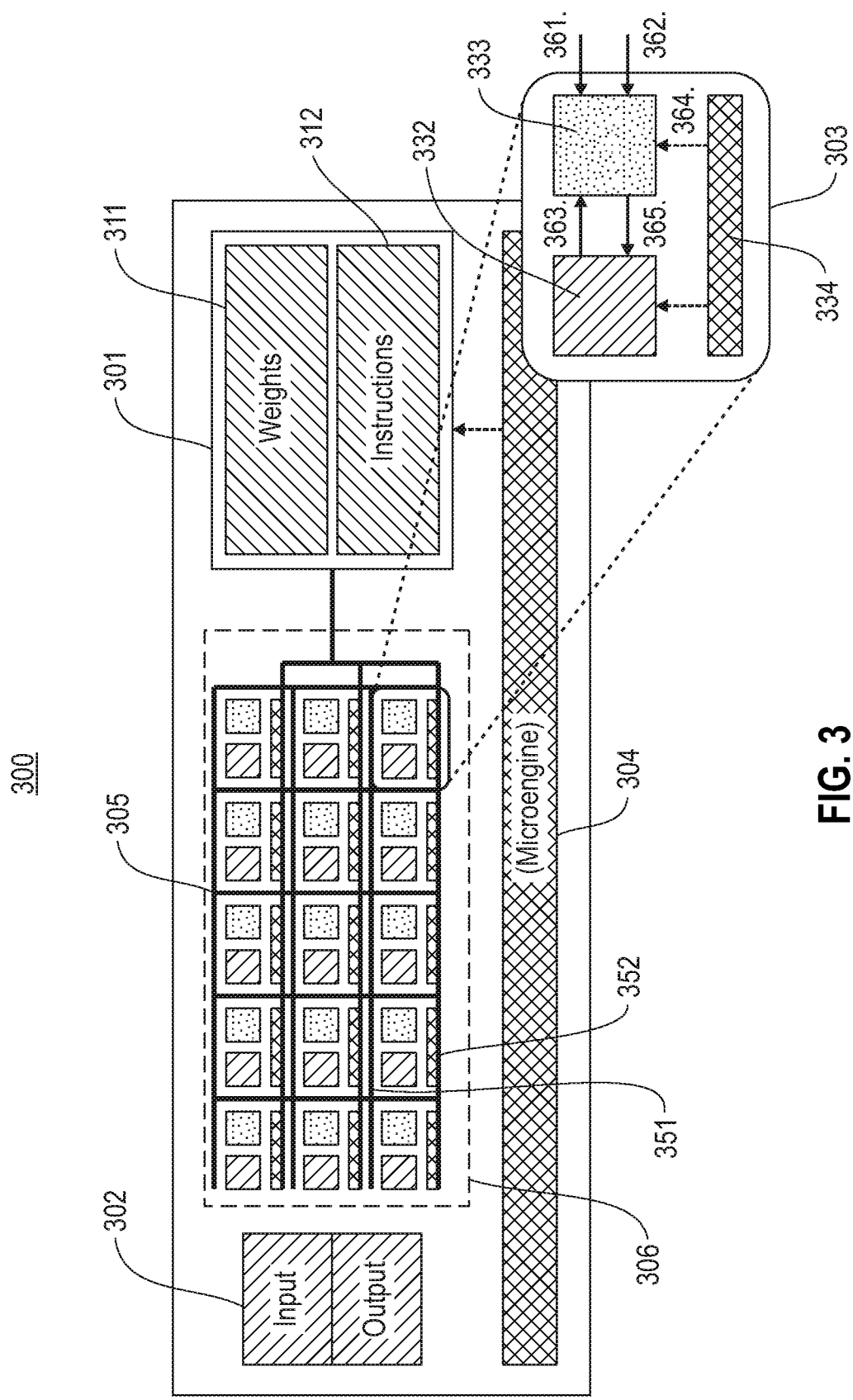
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weight portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the global microengine (chip microengine) and the local core controller (core microengine) collaboratively direct operations. In particular, at 361, compute instructions are loaded from instruction portion 312 of model memory 301 to the core controller 334 on each core 303 by global microengine 304. At 362, parameters (e.g., neural network/synaptic weights) are loaded from weight portion 311 of model memory 301 to the neural computation unit 333 on each core 303 by global microengine 304. At 363, neural network activation data are loaded from activation local activation memory 332 to neural computation unit 333 on each core 303 by local core controller 334. As noted above, the activations are provided to the neurons of the particular neural network defined by the model, and may originate from the same or another neural computation unit, or from outside the system. At 364, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 365, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) Core microcode is run on the core microengines (e.g., 334). In the case of local computation, the core microcode includes instruction(s) to execute a full, single tensor operation. For example, a convolution between a weight tensor and a data tensor. In the case of distributed computation, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

Figure 4:
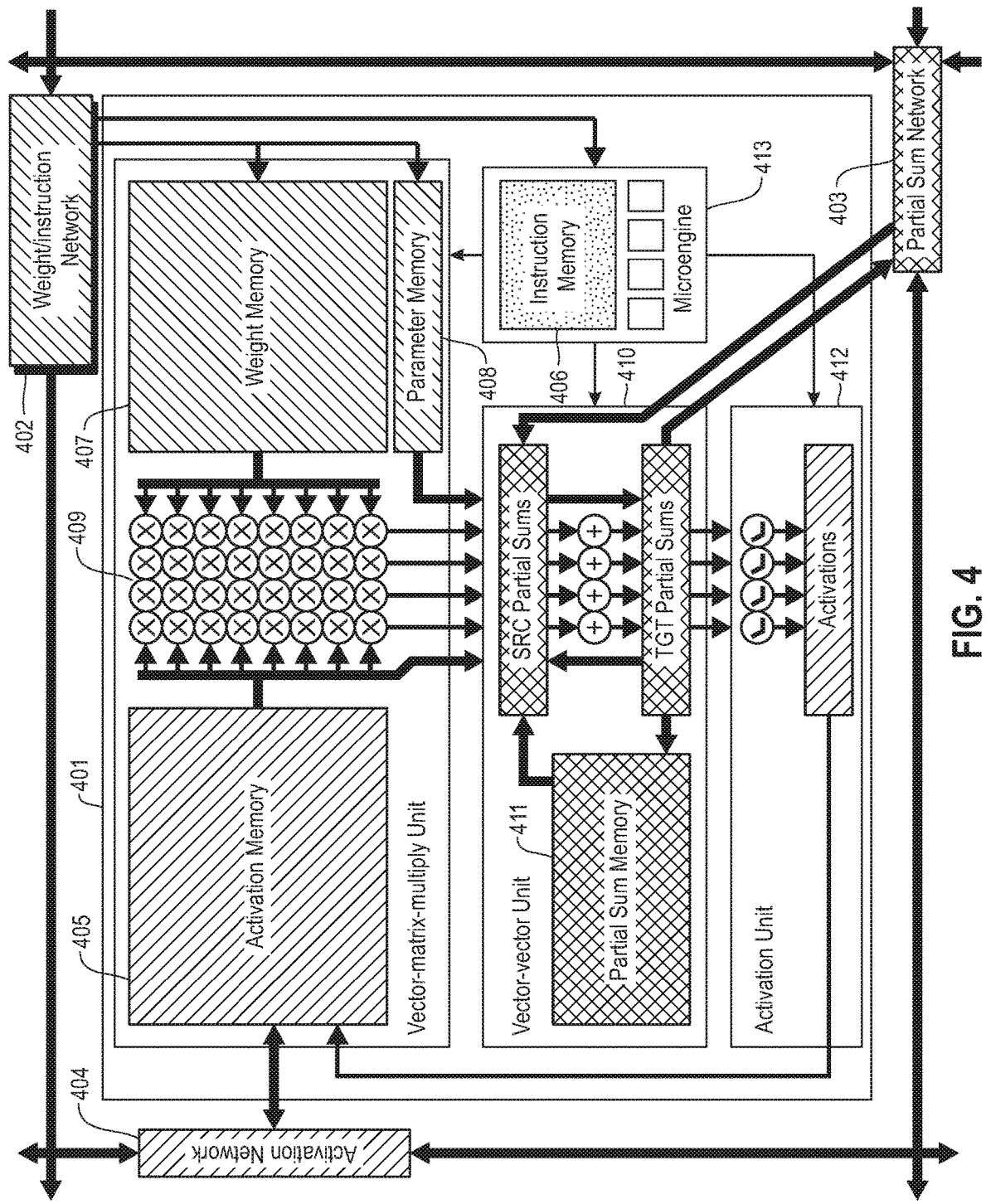
FIG. 4 illustrates a neural core and associated networks according to embodiments of the present disclosure.

With reference now to FIG. 4, an exemplary neural core and associated networks are illustrated according to embodiments of the present disclosure. Core 401, which may be embodied as described with reference to FIG. 1 is interconnected with additional cores by networks 402 . . . 404. In this embodiments, network 402 is responsible for distributing weights and/or instructions, network 403 is responsible for distributing partial sums, and network 404 is responsible for distributing activations. However, it will be appreciated that the various embodiments of the present disclosure may combine these networks, or further separate them into multiple additional networks.

Input activations (X) are distributed core 401 from off-core via activation network 404 to activation memory 405. Layer instructions are distributed to core 401 from off-core via weight/instruction network 402 to instruction memory 406. Layer weights (W) and/or parameters are distributed to core 401 from off-core via weight/instruction network 402 to weight memory 407 and/or parameter memory 408.

The weight matrix (W) is read from weight memory 407 by Vector Matrix Multiply (WM) unit 409. The activation vector (V) is read from activation memory 405 by Vector Matrix Multiply (WM) unit 409. Vector Matrix Multiply (WM) unit 409 then computes vector-matrix multiplication $Z=X^TW$ and provides the result to Vector-Vector unit 410. Vector-Vector unit 410 reads additional partial sums from partial sum memory 411, and receives additional partial sums from off-core via partial sum network 403. A vector-vector operation is computed by Vector-Vector unit 410 from these source partial sums. For example, the various partial sums may in turn be summed. The resulting target partial sums are written to partial sum memory 411, sent off-core via partial sum network 403, and/or fed back for further processing by Vector-Vector unit 410.

The partial sum results from Vector-Vector unit 410, after all computation for a given layer's inputs is complete, are provided to activation unit 412 for the computation of output activations. The activation vector (Y) is written to activation memory 405. Layer activations (including the results written to activation memory) are redistributed across cores from activation memory 405 via activation network 404. Upon receipt, they are written to local activation memory to each receiving core. Upon completion of processing for a given frame, the output activations are read from activation memory 405 and sent off-core via network 404.

Accordingly, in operation, a core control microengine (e.g., 413) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, causing the vector-matrix multiply unit to compute a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation function compute operation, such that the activation function arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 410 include Vector Matrix Multiply (VMM) unit 409, constants from parameter memory 408, partial sum memory 411, partial sum results from prior cycles (TGT partial sums); and partial sum network 403.

Targets for vector-vector unit 410 include partial sum memory 411, partial sum results for subsequent cycles (SRC partial sums), activation unit 412, and partial sum network 403.

Accordingly, a given instruction may read or write from activation memory 405, read from weight memory 407, or read or write from partial sum memory 411. Compute operations performed by the core include vector matrix multiplication by VMM unit 409, vector (partial sum) operations by vector-vector unit 410, and activation functions by activation unit 412.

Control operations include updating program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters in microengines.

Data distribution can be provided from a global memory array according to embodiments of the present disclosure. Global memory array includes a plurality of elements, each comprising a memory element and a buffer. Weights and instructions are provided from global array to array of cores via network. An exemplary configuration of cores is discussed above with regard to FIG. 3. Memory 303 in FIG. 3 may be implemented as described in connection with global memory array.

As set out above, a many core architecture for neural inference provides a significant advantage in computing power. However, if the neural network weights and parameters are not provided to computation cores on time, the cores cannot perform any useful computation. As a result, the performance of a neural chip may be limited by the capability of delivering neural network weights and parameters to computation cores on the chip. On-chip memory greatly improves the memory bandwidth compared to typical off-chip memory such as Dynamic Random-Access Memory (DRAM) or High Bandwidth Memory (HBM). Moreover, on-chip memory is more energy-efficient than off-chip memory, leading to a more power-efficient neural inference system. In various embodiments, the on-chip memory may comprise Static Random-Access Memory (SRAM) or other embedded memories. However, delivering neural network weights to cores at the rate commensurate with the processing speed remains a challenge.

Particular efficiencies may be realized with Convolutional Neural Networks (CNN). In CNNs, the same weight matrix (sometimes referred to as a convolutional filter) is repeatedly used. To minimize the amount of on-chip memory used, it is preferable to store a given weight matrix in one place with no duplication. In order to store a large neural network, some embodiments of the on-chip memory consist of a collection of many memory elements. It will also be appreciated that the many cores are the target of the memory weights. This result in a many-to-many communication problem (many memory elements to many cores). The broadcasting of weights can create network-on-chip (NoC) congestion, and may create a number of conflicts and pipeline stalls, leading to degradation of broadcasting bandwidth.

As outlined above, in various embodiments of a neural inference chip, a grid of neural inference cores is provided to accelerate neural network inference. In various embodiments, prescheduling of instructions is provided. Neural network evaluation involves a regular pattern of computation, and so instructions can be prescheduled without any stalls in order to achieve high performance. However, it is preferred that all the neural network weights are delivered to the cores just-in-time as prescheduled. If the weight delivery network is congested and weight delivery stalls, the prescheduling of neural network evaluation fails.

The present disclosure provides for a stall-less weight delivery network-on-chip to deliver weight parameters from a grid of memory elements to a grid of computation cores. The one dimensional scheme is first shown below, and then extended to a two-dimensional grid scheme. These approaches are further extended to support different various weight distribution such as striping (where different rows of cores get different weights).

The approaches described herein work without conflict even if the time to deliver instruction to the memory element and deliver data from the memory element to computing cores varies. These approaches address instruction flow that can access any column at any order. The new schemes remove the constraint that all columns start at the same time.

In accordance with an aspect of the disclosure, conflict-free and stall-free broadcast is provided for network-on-chip (NoC) applications. In some embodiments, the broadcasting data is provided over a network-on-chip (NoC) from multiple sources, with zero stall cycles on the network such that: data is not back-pressured on the NoC; data is provided back-to-back (no empty slots on the NoC); and data remains collision free.

As such, the present disclosure provides numerous advantages, including:
  incorporating multiple sources which enables distributed memory storage;
  precise, deterministic, scheduled operation;
  full throughput required (no empty cycles, no lost data);

router design simplicity—minimal design for very wide datapath; and program simplicity (e.g., same program at every node).

Figure 5:
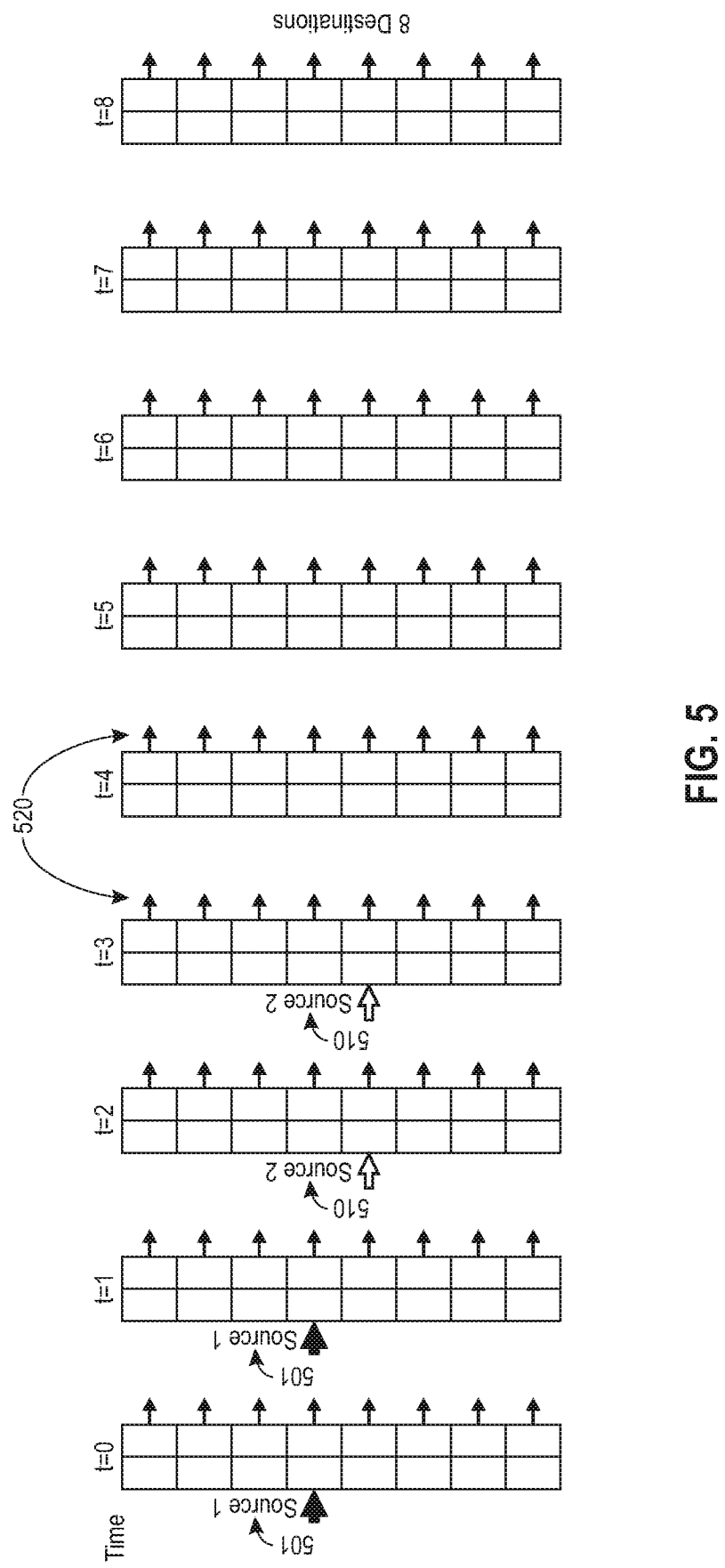
FIG. 5 is a schematic view of a one dimensional broadcast network-on-chip (NOC), according to embodiments of the present disclosure.

Referring now to FIG. 5, an exemplary one dimensional broadcast of network-on-chip is illustrated according to embodiments of the present disclosure. As shown, a first source 501 ("source 1") broadcasts to multiple destinations on the bus, at different times t=0 and t=1. Then, a second source 510 ("source 2") is broadcasted, at times t=2 and t=3 without overlap (conflict) with the broadcast of the first source, and without introducing any empty cycles in the network. In the exemplary embodiment shown, there are two broadcast sources and eight destinations (illustrated by the vertical boxes or cells); however it will be understood by artisans of ordinary skill that data sources and destinations can be scaled up/down as desired. In the exemplary embodiment, the first source 501 is introduced at the midpoint (or fourth destination), and the second source 510 is introduced at a different location (e.g. one destination lower than that of the first source 501). The data will eventually reach all locations as indicated by arrows 520.

Figure 6:
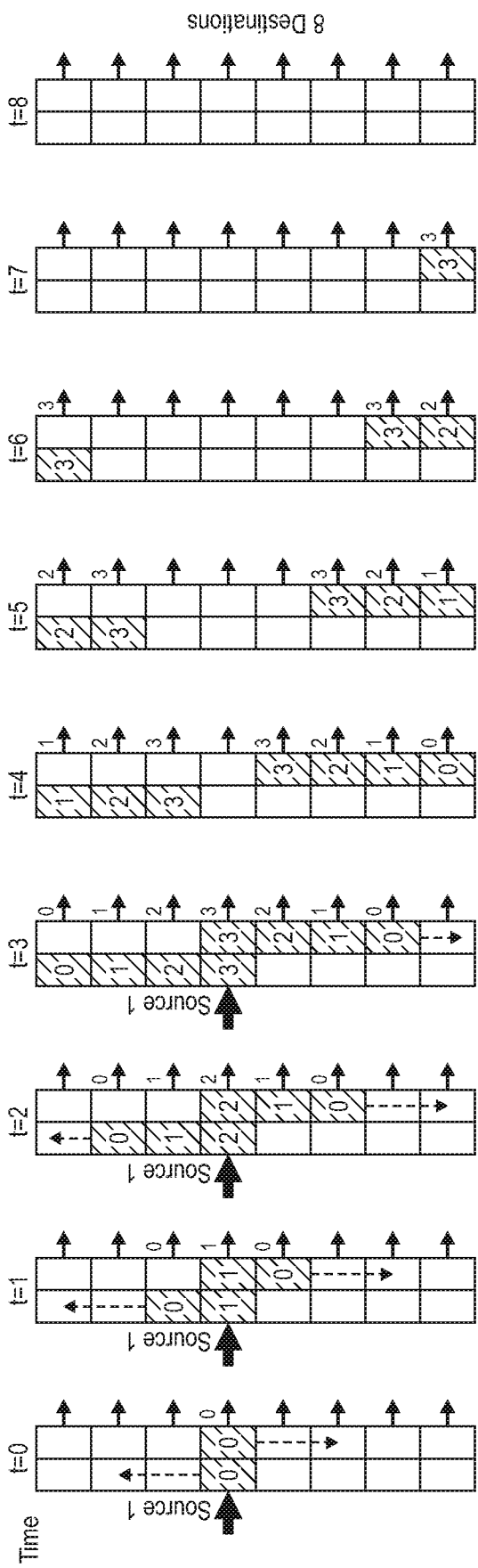
FIGS. 6-7 are schematic views of exemplary baselines of a one dimensional broadcast network-on-chip (NOC), according to embodiments of the present disclosure.

Referring now to FIG. 6, an exemplary baseline of a one dimensional broadcast network-on-chip is shown. In this example, the first source ("source 1") transmits four successive data words (0:3). As each increment of time advances, the data words propagate vertically in opposite directions. As data propagates, all destinations will receive all data words (0:3) in sequence. At time t=4, the first destination cell where source 1 introduced the data has been cleared or emptied due to the propagation of the data. This clearing of data continues until each of the data (0:3) have propagated beyond all eight vertical destinations, as shown at time t=8.

Figure 7:
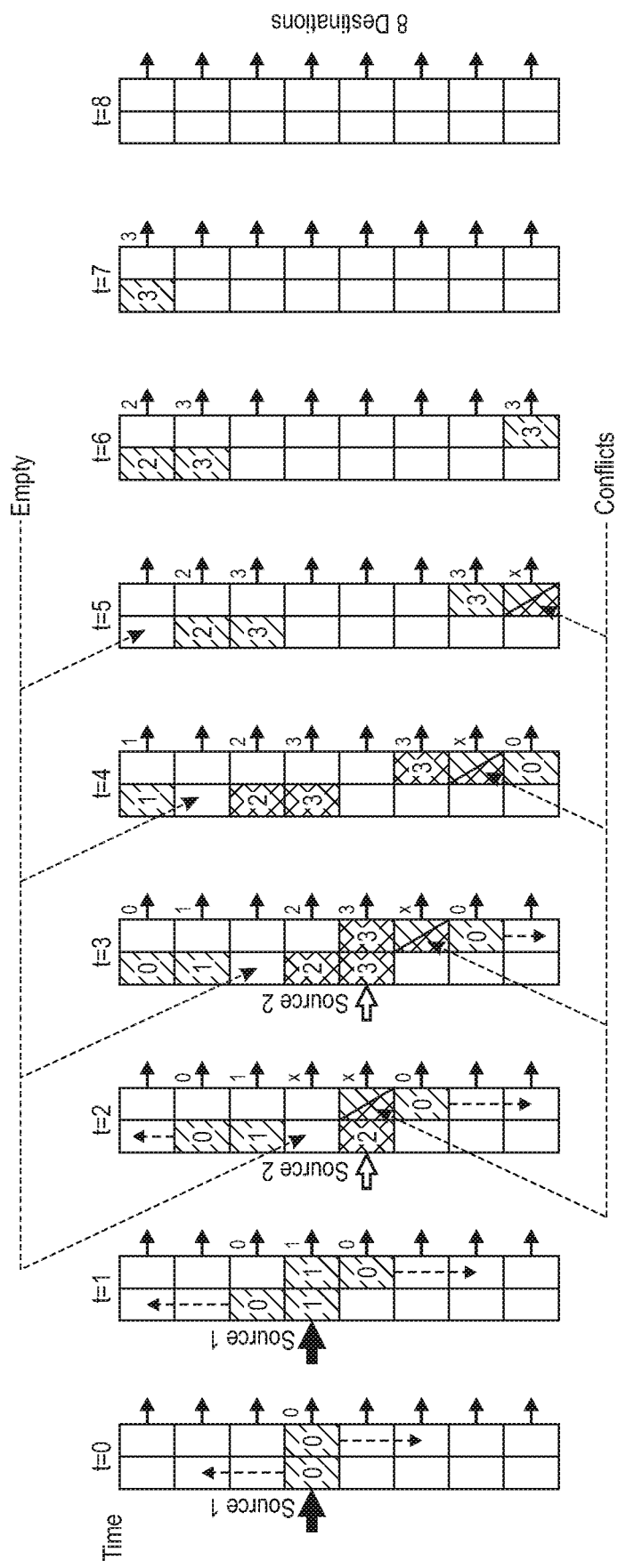

FIG. 7, is another exemplary baseline of a one dimensional broadcast network-on-chip is shown, where due to one clock cycle latency, both empty cells and conflicts are presented. Here, once a first source ("source 1") transmits two successive data words (0:1) into the fourth cell 701, as shown in the t=0 and t=1 columns. Then, a second source ("source 2") transmits two successive data words (2:3) into adjacent cell 720, as shown in the t=2 and t=3 columns. The data propagates vertically in opposite directions, as previously described. Consequently, a plurality of cells are empty (as shown, beginning at column t=2 through column t=5) which reduces efficiency and performance. Further, a plurality of cells have conflicts created by the concurrent presence of data from both Source 1 and Source 2 (as shown, beginning at column t=2 through column t=5, or until the data propagates through the destinations), which further reduces efficiency and performance. The present disclosure provides a novel approach to avoid such empty and conflicting data flow.

Figure 8:
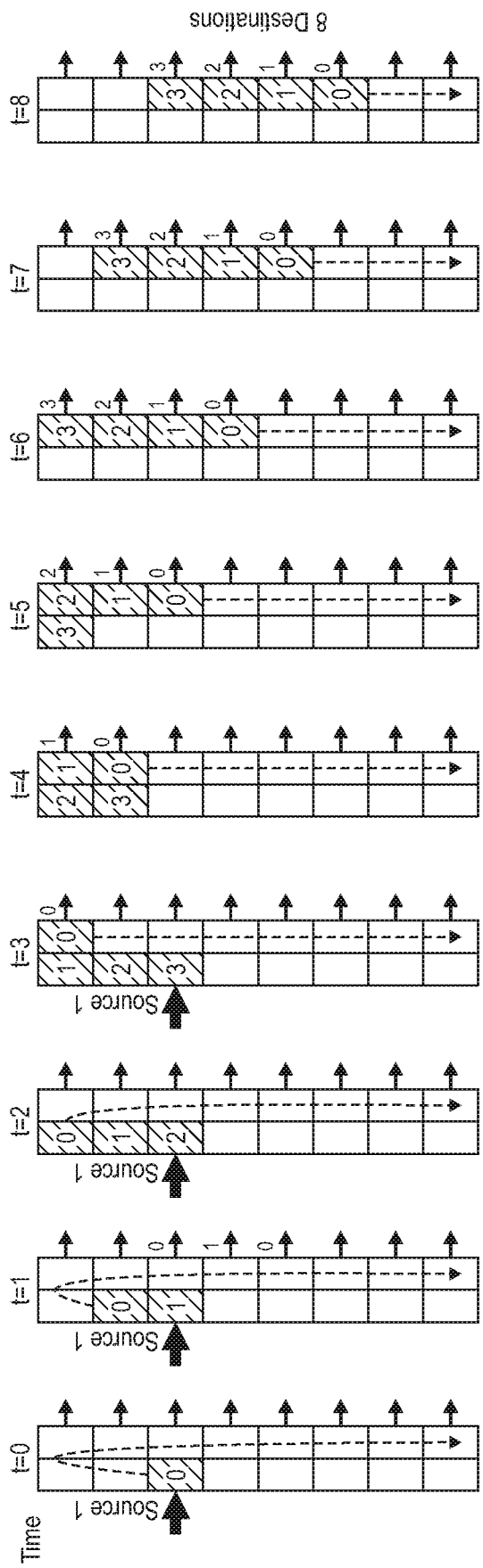
FIGS. 8-10 are schematic views of exemplary baselines of a one dimensional broadcast network-on-chip (NOC) employing a J-scheme, according to embodiments of the present disclosure.

FIG. 8, depicts an exemplary embodiment in accordance with the present disclosure in which a J-scheme data flow can be incorporated to avoid the occurrence of empty or conflicting data broadcast. As shown, once Source 1 transmits four successive data words (0:3), the data propagate vertically in one direction. In this exemplary embodiment, the data flows North (N) (or upwardly) until it reaches the top cell, where the data are looped back for delivery in the opposite direction (S) (or downwardly) as indicated by the broken arrow data flow. While the data is on the downward trajectory (i.e. beginning at time t=3) the data is delivered to the destination address.

Figure 9:
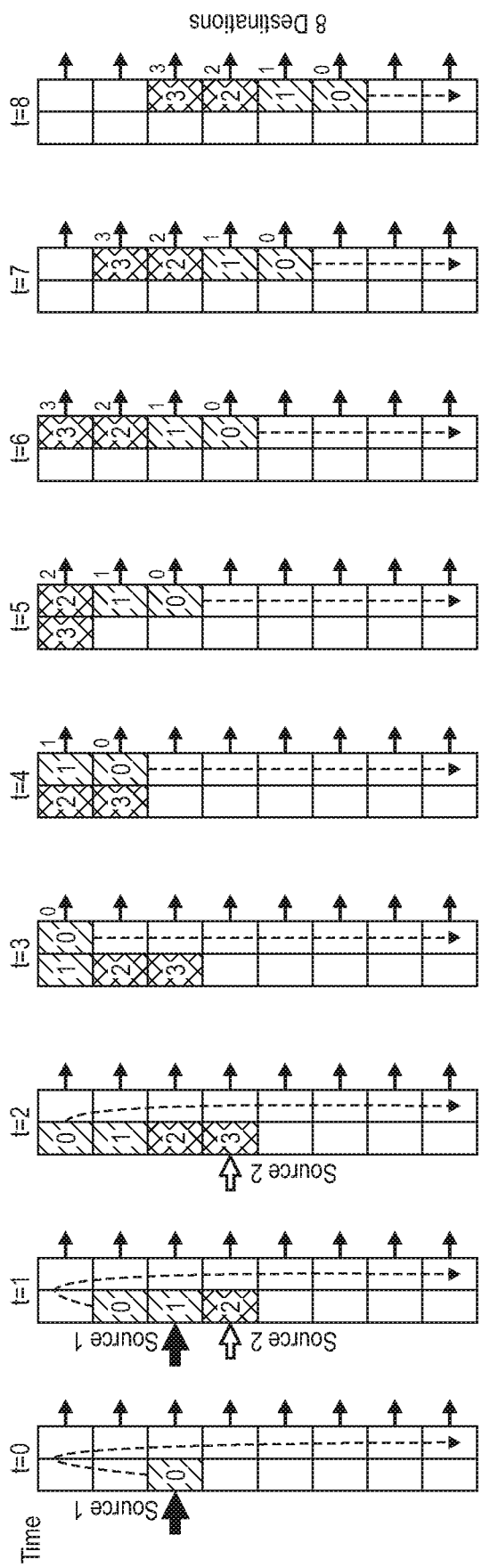

FIG. 9, depicts another exemplary embodiment in accordance with the present disclosure in which a J-scheme data flow can be incorporated to avoid the occurrence of empty or conflicting data broadcast. Here, once Source 1 transmits two successive data words (0:1) at time t=0 and t=1, then a second adjacent Source 2 transmits two successive data words (2:3) at time t=2 and t=3. The data words propagate vertically in one direction (N), and are looped back for delivery in the opposite direction (S), with Source 1 data looping back (i.e. reversing propagation direction) beginning at time t=3, and Source 2 data looping back (i.e. reversing propagation direction) beginning at time t=5. As illustrated, there are no conflicts nor empty data cells/addresses between the Source 1 and Source 2 inputs, and this remains true throughout the entire propagation path.

Figure 10:
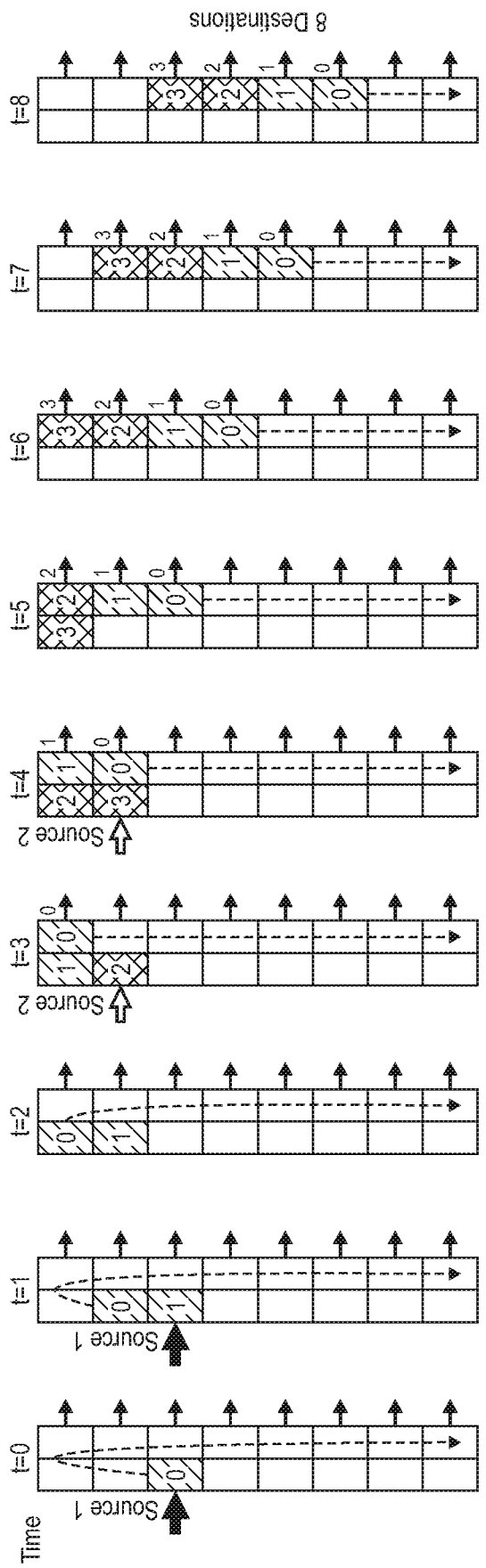

FIG. 10, depicts another exemplary embodiment in accordance with the present disclosure in which a J-scheme data flow can be incorporated to avoid the occurrence of empty or conflicting data broadcast. Here, once Source 1 transmits two successive data words (0:1) at time t=0 and t=1, then a second adjacent Source 2 transmits two successive data words (2:3) at time t=3 and t=4. Note, here Source 2 does not transmit at time t=2. Thus, Source 2 transmits its initial data (at time t=3) at a higher position (i.e. the second cell from the top) in order to avoid the occurrence of an empty cell. Once transmitted, data words again propagate vertically in one direction (N), and are looped back for delivery in the opposite direction (S), as previously described.

In accordance with an aspect of the present disclosure, the data propagation at time t=8 is the same for each of the examples depicted in FIGS. 8-10. Thus the delivery pattern to eight destinations is identical over all three J-Scheme examples shown.

Figure 11:
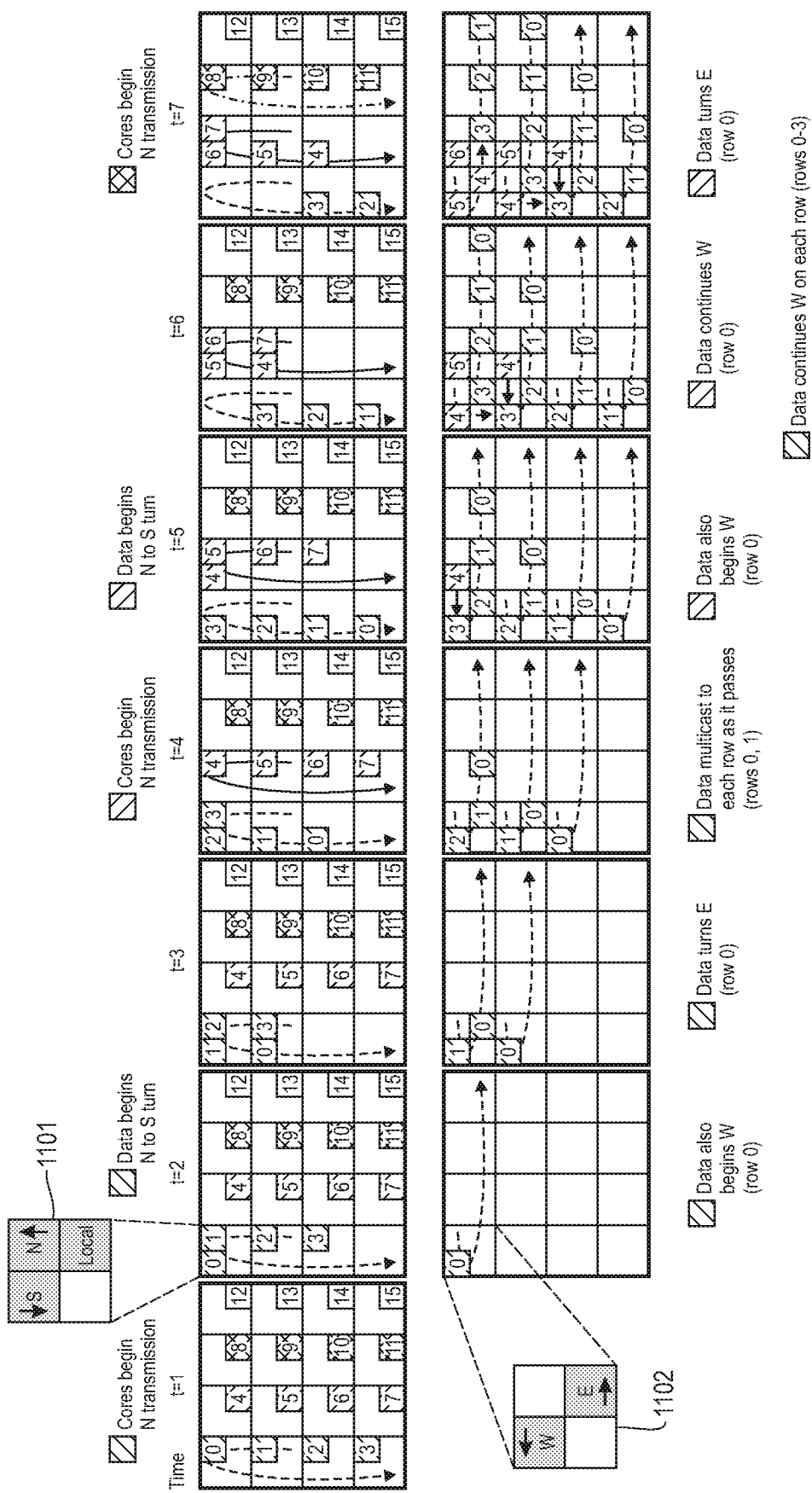
FIG. 11 is a schematic view of a two dimensional broadcast network-on-chip (NOC), according to embodiments of the present disclosure.

FIG. 11, depicts an exemplary embodiment in accordance with the present disclosure in which a J-scheme data flow can be incorporated in a two dimensional broadcast network-on-chip. As the cores (0:3) begin transmission, the data begins to travel upward, or in the N direction, as shown in by the dashed line at time t=1. At time t=2, this data turns and reverses direction in accordance with the J-scheme disclosed herein after it reaches the upper limit, as shown in the callout 1101. Thus, at time t=3 the transmission of cores (0:3) resides in the first two rows, with data from cores 1 and 2 cohabiting the first row, and data from cores 0 and 3 cohabiting the second row.

At time t=4 a second source begins to transmit data from cores (4:7) with the data propagating in a similar J-scheme, as shown by the solid line. At time t=5 the data transmission from the second core begins to turn and reverse direction from N to S. Thus, at time t=6 the data from the first cores (0:3) has completely changed direction to all be propagating in the S direction, with the first transmission 0 having been delivered to the output; meanwhile data from the second cores (4:7) is located within the first two rows, with data from cores 5 and 6 cohabiting the first row, and data from cores 4 and 7 cohabiting the second row, as shown.

At time t=7 a third source begins to transmit data from cores (8:11) with the data propagating in a similar J-scheme, as shown by the dash-dot-dash line. At this point, half the data from the first cores (0:3) has been delivered to the output leaving only the data from core 2 and core 3 still propagating in the S direction. Data transmission from the second source (i.e. cores 4:7) have almost completely reversed direction with the data from core 7 in the upper limit and about to turn to the S direction at the next clock cycle. None of the data from the third source (i.e. cores 8:11) has turned direction yet.

In accordance with an aspect of the present disclosure, the J-scheme data propagation flow described above for the first (vertical) dimension can also be employed in a second (horizontal) dimension. This horizontal dimension is shown in the callout 1102, where data initially propagate in a W (or leftward) direction and reverses to an E (or rightward) direction upon reaching the W/left boundary, as shown by the dashed arrows.

Referring to the lower cores depicted in FIG. 11, at time t=3, a first transmission of data from cores (0:3) is shown in the first row with the 0 data having already reversed into the E direction, and a second transmission of data from the same cores (0:3) can begin to transmit in the second row, with none of the data having reversed direction yet. This can continue with data from cores (0:3) multicast to each row as it passes, as shown at time t=4. Next, data from a second source of cores (4:7), which follows the same W to E J-scheme propagation, can begin to simultaneously transmit, as shown at time t=5. In this exemplary two-dimensional embodiment, data is first propagated in the vertical dimension (N to S), then the horizontal (W to E), such that as data arrives from the vertical dimension it is fed into the horizontal dimension. As shown at times t=6 and =7, the simultaneous broadcast of multiple sources remains free of any empty, or conflicting, data flows for this two-dimensional broadcast.

Figure 12:
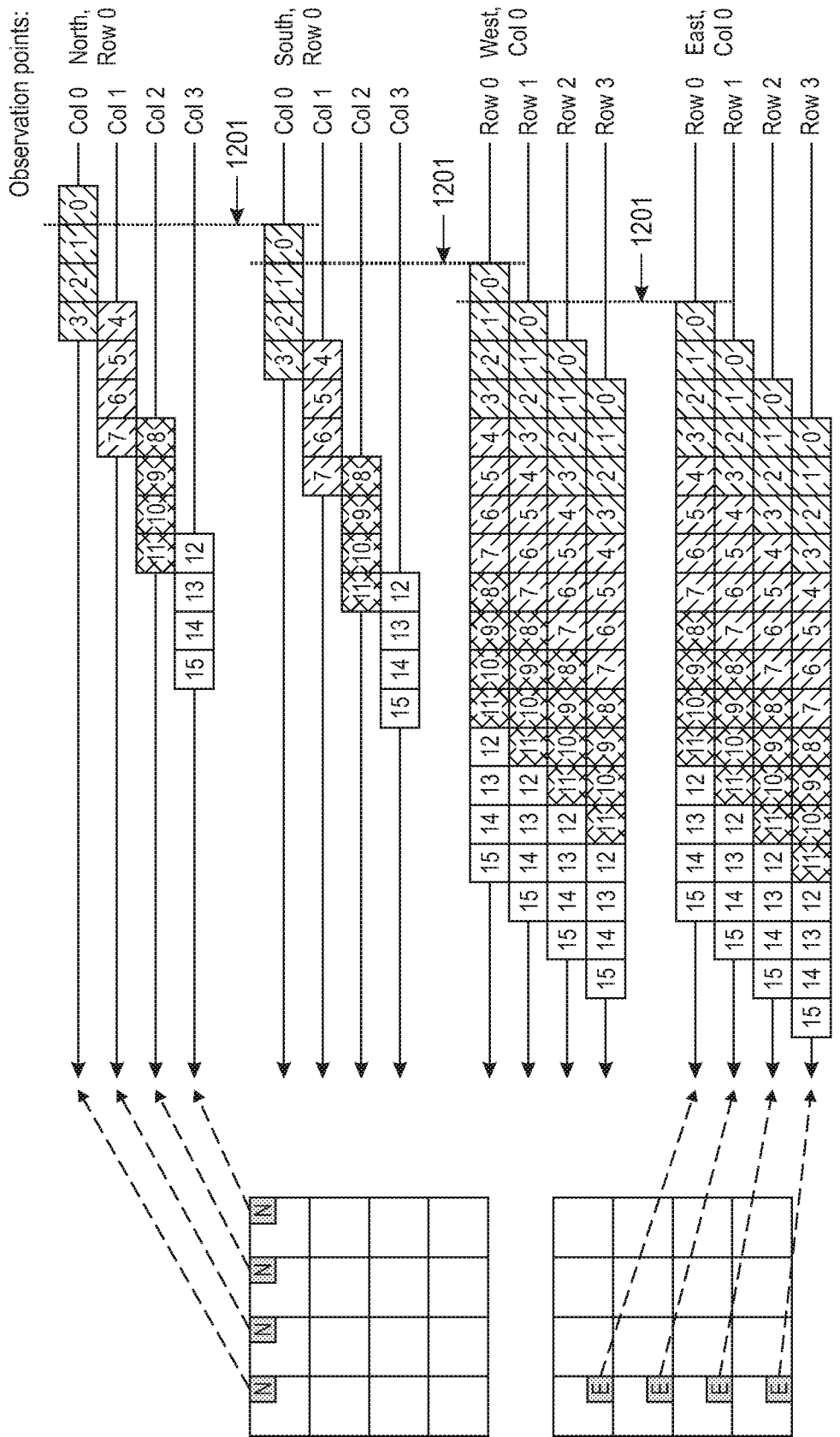
FIG. 12 is a schematic view of a two dimensional broadcast network-on-chip (NOC) employing a J-scheme, according to embodiments of the present disclosure.

FIG. 12, depicts an exemplary two-dimensional J-scheme timing diagram, in accordance with the present disclosure. As shown, cores within a column transmit data simultaneously, where each column transmits its data in staggered order such that transmission of core 3 (in Col. 0 of the North, Row 0)—overlaps with the data of core 4 (in Col. 1 of the North, Row 0) but is presented on a different bus. Here the dotted lines 1201 show a one-cycle offset in timing. In accordance with an aspect of the present disclosure, by using sources from two columns, two different streams of data can be distributed in parallel. For example: source 1, from column 1 can deliver to even rows, while source 2, from column 2 can deliver to odd rows (without conflict). This feature can be generalized, such that it is true for N streams of data. An advantage of this approach is that it increases the effective bandwidth of distributing unique data.

Figure 13:
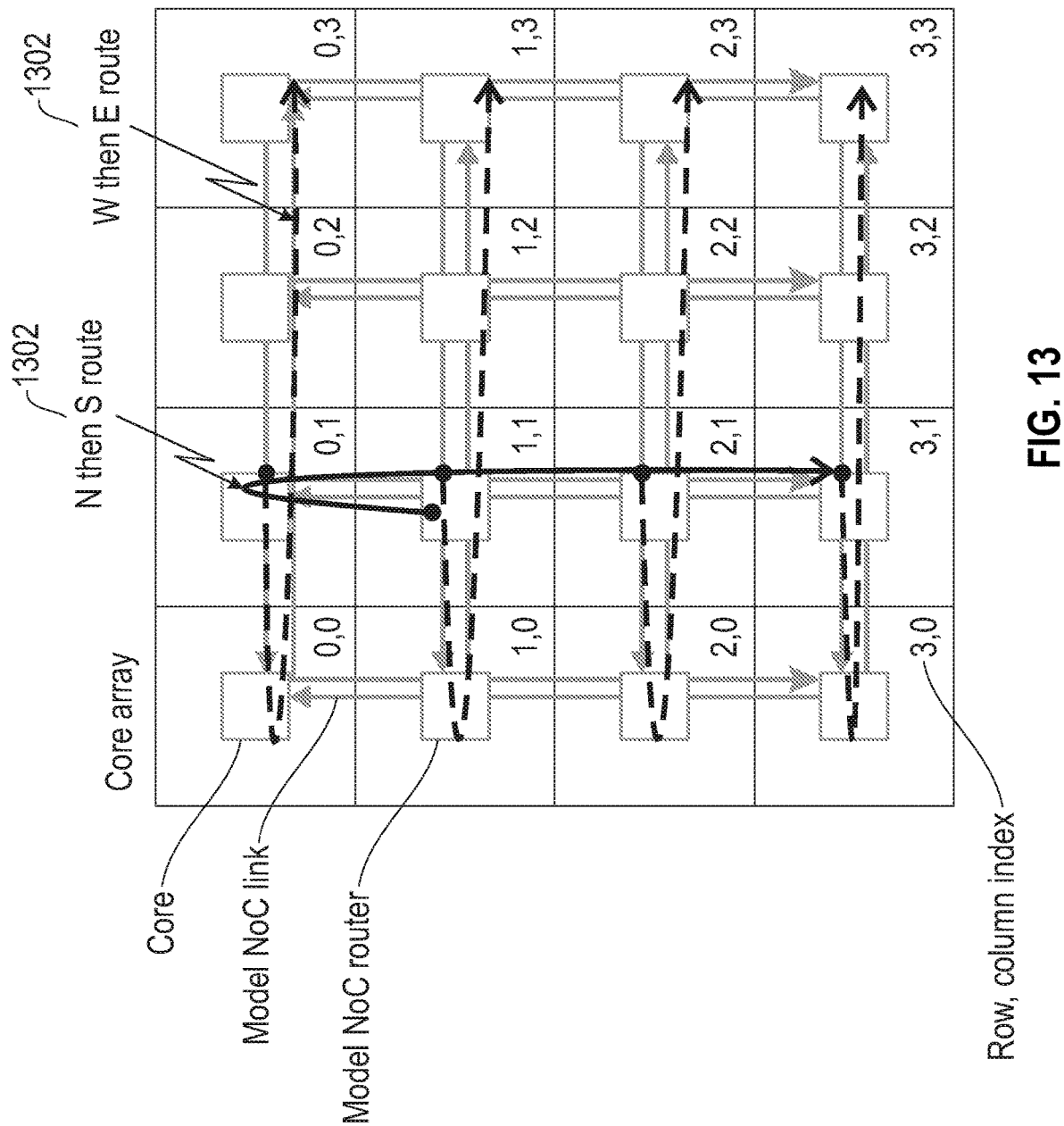
FIG. 13 is a schematic view of a model network-on-chip (NOC) J-scheme overview, according to embodiments of the present disclosure.

In accordance with an aspect of the present disclosure, a model network-on-chip (MNoC), the structural definition can include: J-scheme Overview; Routing Rules (Operation); Packet Format with field (signal) definitions; Addressing with direct addressing and distribution flags; Router structure; Router paths (list of); Read/Write transactions; External interface; and Latency/skew analysis. A textual representation of the protocol illustrated in FIGS. 5-12 can be represented as follows:

"J" scheme protocol pseudocode:
  Go North to edge of core array
  Loop to South
  Travel South to edge of core array
  While traveling South, for each row, if matching Y-distribution flags (or row address in direct addressing mode), deliver to row
  Go West to edge of core array
  Loop to East
  Travel East to edge of core array
  While traveling East, for each column, if matching X-distribution flags (or column address in direct addressing mode), deliver to core FIG. 13, depicts an exemplary model network-on-chip J-scheme overview, in accordance with the present disclosure. In some embodiments, the Y-X dimension routing is ordered such that data propagates in the Y dimension first, then X dimension. Accordingly, data packets follow two "J" shaped routes in order:

i. First route: North then South (as illustrated by the solid J-scheme arrows) 1301.
  ii. Second route: West then East (as illustrated by the dashed J-scheme arrows) 1302.

The path of the "J" routes propagates data to travel to the end of the array, and then the data is looped back. On the second leg of the route (after the loopback) data traverses the entire length of the array (in multicast addressing mode). Data is delivered on the second leg of the route (after it is looped back). Also, two addressing modes can be included:
  i. Multicast addressing, which delivers data to all matching destinations; and
  ii. Direct addressing, which delivers data to the one matching destination, based on core row, column index.

In accordance with an aspect of the present disclosure, the model network-on-chip can include routing rules. For example, a rule can be implemented such that within the Y or X dimension, packets always traverse one direction before the other:
  Y dimension: North then South
  X dimension: West then East Additionally, a rule can be implemented such that at the North (or West) end of the array packets are looped from North to South (West to East). Further, a rule can be implemented such that at the South (or East) end of the array packets are dropped. Also, a rule can be implemented regarding packet injection such that:
  Within the array, packets are always injected to the North direction
  Special boundary case for injecting data from outside of the array, into the array Further, a rule can be implemented regarding packet delivery—such that when address matches:
  East going packets are delivered to cores
  South going packets are delivered to West direction
  Distribution flags (multicast) mode: packets are delivered and continue to propagate in the same direction
  Direct addressing mode: packets are delivered and do not continue to propagate in the same direction.

Figure 16:
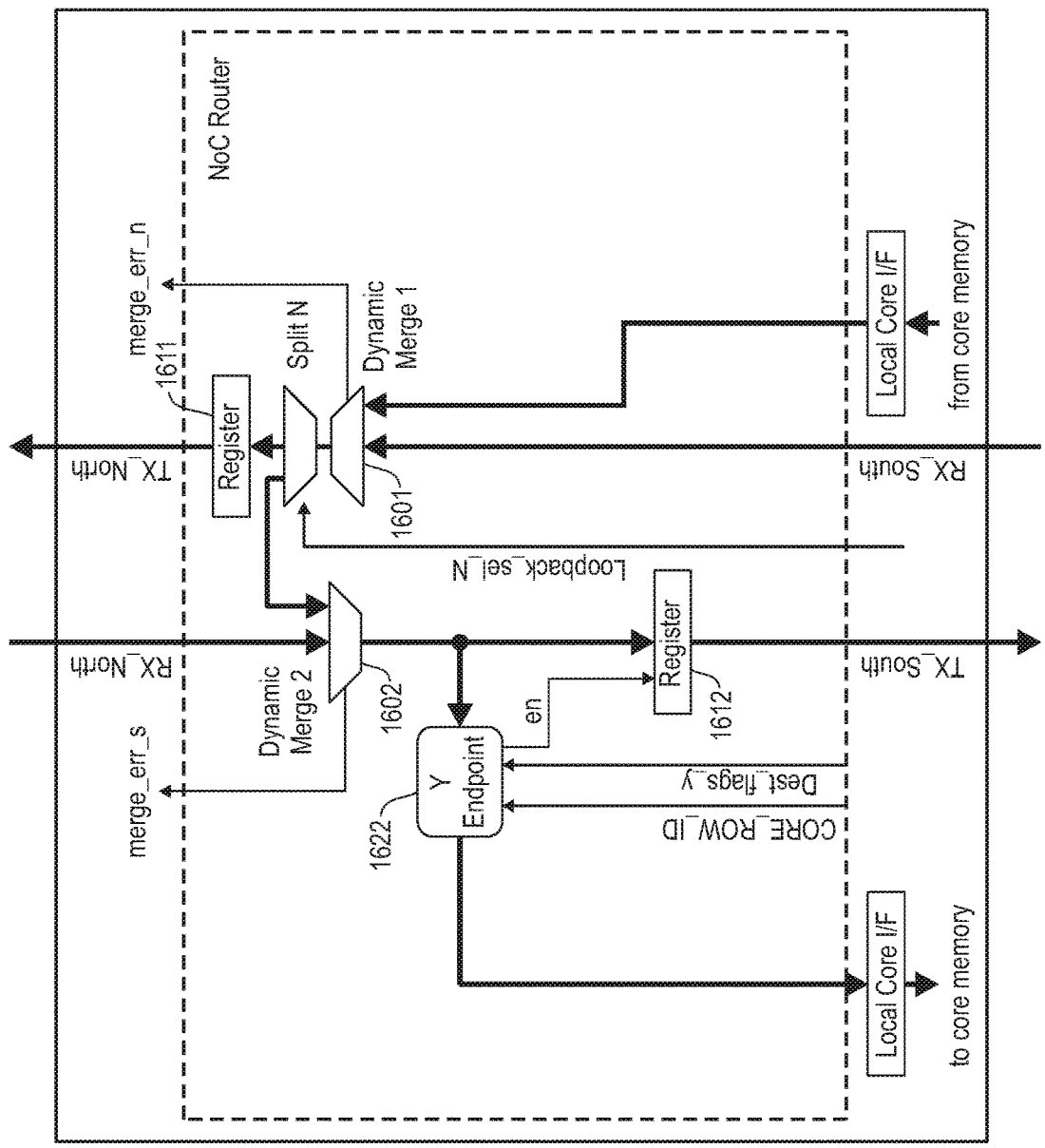
FIG. 16 is a schematic view of a model network-on-chip (NOC) one-dimensional router, according to embodiments of the present disclosure.

FIG. 14, depicts an exemplary packet format, in accordance with the present disclosure. The example illustrated is for packets in a 16×16 core array. In some embodiments, "ext_in_" and "ext_out_transaction" are mutually exclusive, and they may not both be '1' simultaneously. Also, some exemplary transactional definitions for this configuration are as follows:
  ~ADDR_VALID & ~DATA_VALID=no transaction (idle)
  ~ADDR_VALID & DATA_VALID=invalid state (error)
  ADDR_VALID & ~DATA_VALID=read transaction
  ADDR_VALID & DATA_VALID=write transaction FIG. 15, depicts an exemplary model network-on-chip addressing, in accordance with the present disclosure. Direct Addressing (North/South Direction) is shown at 1501. Direct Addressing (East/West Direction) is shown at 1502, where CORE_ROW_ID and CORE_COL_ID are determined by the location of the core in the core array. Also, the packet is delivered to the unique core that matches the 4 bit DISTR_ROW_ID or DISTR_COL_ID in the packet. Direct Flag (multicast) Addressing is shown at 1503, where DISTR_FLAGS are compared with DEST_FLAGS according to the Boolean match equation. Also, DEST_FLAGS are set per core in the core control registers. Further, the packet is delivered to every core that matches according to the Boolean match equation comparing the DISTR_FLAGS in the packet and the DEST_FLAGS set in the core. Some exemplary Boolean Match Equations employed in the NoC addressing can include:

ANY match=OR REDUCE (DISTR_FLAGS & DEST_FLAGS)
 ALL match=~OR REDUCE (DISTR_FLAGS & ~DEST_FLAGS)=
 =AND_REDUCE (~DISTR_FLAGS|DEST_FLAGS)//alternative DeMorgan equivalent specification
 NOT ANY match=~OR REDUCE (DISTR_FLAGS & DEST_FLAGS)
 NOT ALL match=OR REDUCE (DISTR_FLAGS & ~DEST_FLAGS)
 where "~" is inversion, "&" is the bit-wise AND operation, and "|" is the bit-wise OR operation FIG. 16, depicts an exemplary one-dimensional router for a model network-on-chip, in accordance with the present disclosure. In this exemplary model, register values are updated every cycle so that old data from prior cycles is not retained. The timing is such that each register incurs 1 clock cycle delay, and each endpoint also contains 1 register. Here the data propagation is in the vertical dimension (as shown by the "RX_North", "RX_South" and "TX_North", "TX_South" arrows). The "RX_South" data is fed upward into a first Dynamic Merge 1601 and corresponding register 1611 and can be output as "RX_North"; the "RX_North" data is fed downward into a second Dynamic Merge 1602 and corresponding register 1612 and/or Y endpoint 1622 and can be output as "TX_South".

Figure 17:
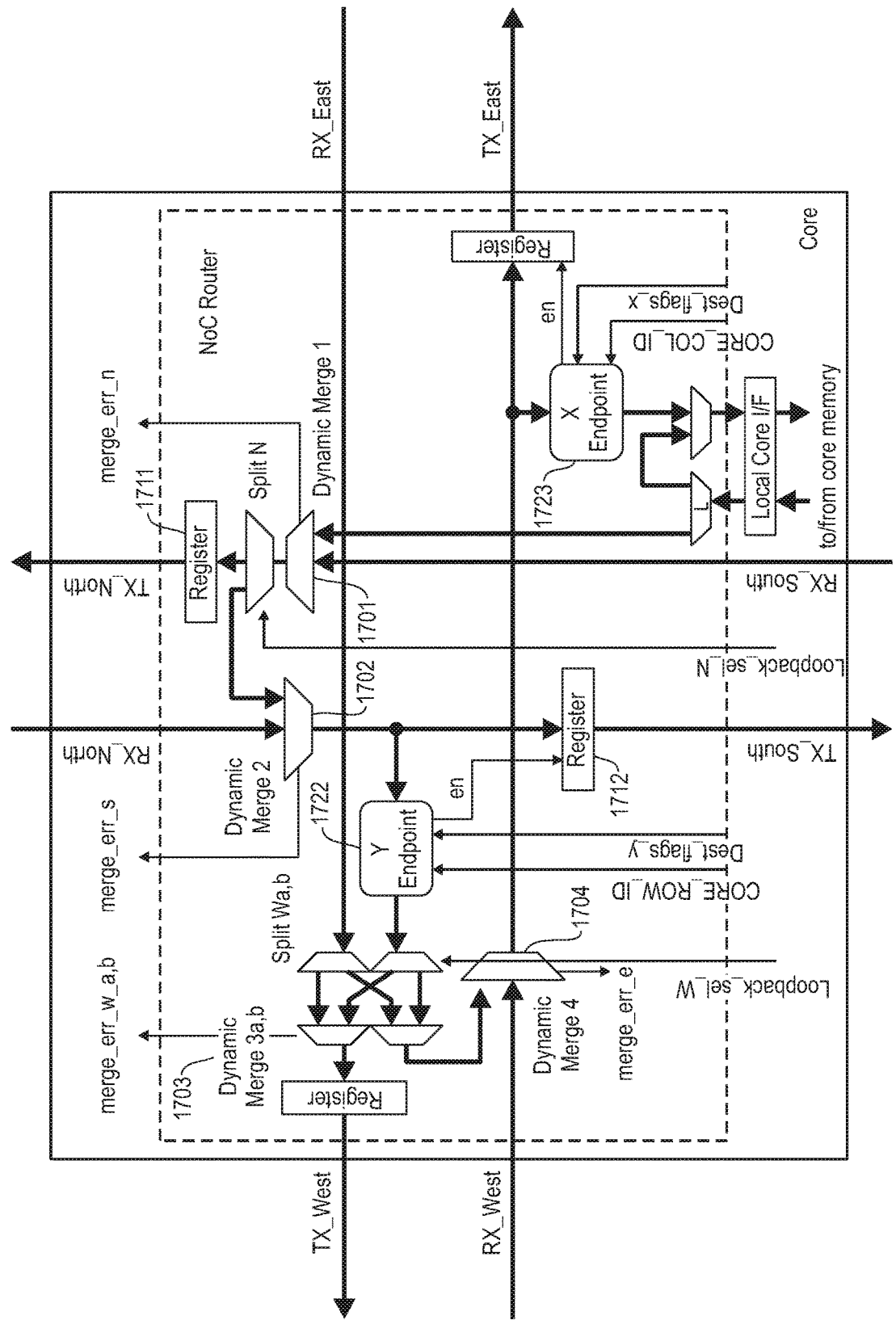
FIG. 17 is a schematic view of a model network-on-chip (NOC) two-dimensional router, according to embodiments of the present disclosure.

FIG. 17, depicts an exemplary two-dimensional router for a model network-on-chip, in accordance with the present disclosure. In this exemplary model, register values are updated every cycle so that old data from prior cycles is not retained. The timing is such that each register incurs 1 clock cycle delay, and each endpoint also contains 1 register. Here the data propagation is in the vertical dimension (as shown by the "RX_North", "RX_South" and "TX_North", "TX_South" arrows) as well as in the horizontal dimension (as shown by the as shown by the "RX_West", "RX_East" and "TX_West", "TX_East" arrows). The "Rx_South" data is fed north (or upward) into a first Dynamic Merge 1701 and corresponding register 1711 and can be output as "TX_North"; the "RX_North" data is fed south (or downward) into a second Dynamic Merge 1702 and corresponding register 1712 and/or Y endpoint 1722; when passing through register 1712, the output can be "TX_South". It is at Y endpoint 1722 where delivery from the vertical dimension to the horizontal dimension occurs. Also, the "RX_East" can be fed westerly (or left) through a third dynamic merge 1703 and be output as "TX_West". The "RX_West"* can be fed easterly (or right) through a fourth dynamic merge 1704 and be output as "TX_East" and/or X endpoint 1723.

In accordance with another aspect of the disclosure, dynamic splits can be included for governing the operation of the routers. For purpose of illustration and not limitation, an exemplary dynamic split can be implemented as follows:
Split N
 if (LoopbackSelNorth)
  Loopback the packet to the S bus
 else
  Pass the packet through to the N bus
 end
Split W
 if (~ext_out_transaction) && (LoopbackSelWest)
  Loopback the packet to the E bus
 else
  Pass the packet through to the W bus
 end
Split L
 if (~ext_out_transaction) &&
  (AddrModeY==Direct) &&
  (TargetRowId==localCoreRowId) &&
  (AddrModeX==Direct) &&
  (TargetColId==localCoreColId)
  Loopback the packet to the Local bus
 else
  inject into MNoC (north)
 end
Additionally, exemplary Loopback definition can be as follows:
 LoopbackSelNorth=(RowID==0)||(MNoC_Enable_N_Loopback==1)
 LoopbackSelWest=(ColID==0)||(MNoC_Enable_W_Loopback==1)

The Y Endpoint 1722 and X Endpoint 1723 shown in FIG. 17 can implement the address match logic. In some embodiments, when in direct addressing mode only, if a packet direct address matches the core row/col ID, the packet is delivered and does not continue propagating in its original direction. The Dynamic Merges 1701-1704 transmit valid data packets from either input. Data packets must be scheduled to avoid collisions (two simultaneously valid packets input into the dynamic merge). In the event of a collision, an ERROR flag is asserted and one of the data packets is dropped as follows:

North dynamic merge 1: North-bound (RX_South) has priority over local (i.e. local data is dropped)
 South dynamic merge 2: South-bound (RX_North) has priority over loopbackN (i.e. loopbackN data is dropped)
 West dynamic merge 3: West-bound (RX_East) has priority over South (i.e. South data is dropped)
 East dynamic merge 4: East-bound (RX_West) has priority over loopbackW (i.e. loopbackW data is dropped)

FIG. 18, depicts an exemplary list of router paths for a model network-on-chip, in accordance with the present disclosure, where "Cycles"=cycles within the model network-on-chip router. This exemplary listing of router paths correlates to the exemplary embodiment shown in FIG. 17. When a Write or Read request is sent from external interface to core array, the external control interface injects data packets into south-bound path (RX_North) of Core (0,0). This can be implemented by setting "ext_in_transaction" bit=1. The data packets follow normal J-scheme, going south. This can be implemented by setting the Y and X address as normal to get to destination(s). When a Write or Read request is sent core array to external interface (e.g. returned read data), the cores inject data into North-bound path, using Local Core I/F. This can be implemented by setting "ext_out_transaction" bit=1. The data propagate north to edge of core array, loop back to south, and deliver to row 0. This can be implemented by setting Y address=direct address mode, row 0. Also, the data can propagate West to edge of core array by setting the X address to any desired value. Data can be delivered to external control interface where "ext_out_transaction" bit sends data off of core array, instead of looping it back to the East at Core (0,0). Also, in some scenarios "ext_out_transactions" from core 0,0 can collide with "ext_in_transactions", such as in a burst read. Accordingly, the W bypass in the core 0,0 router will overlap "ext_out_transactions" from all other cores with "ext_in_transactions", avoiding collisions.

Figure 19:
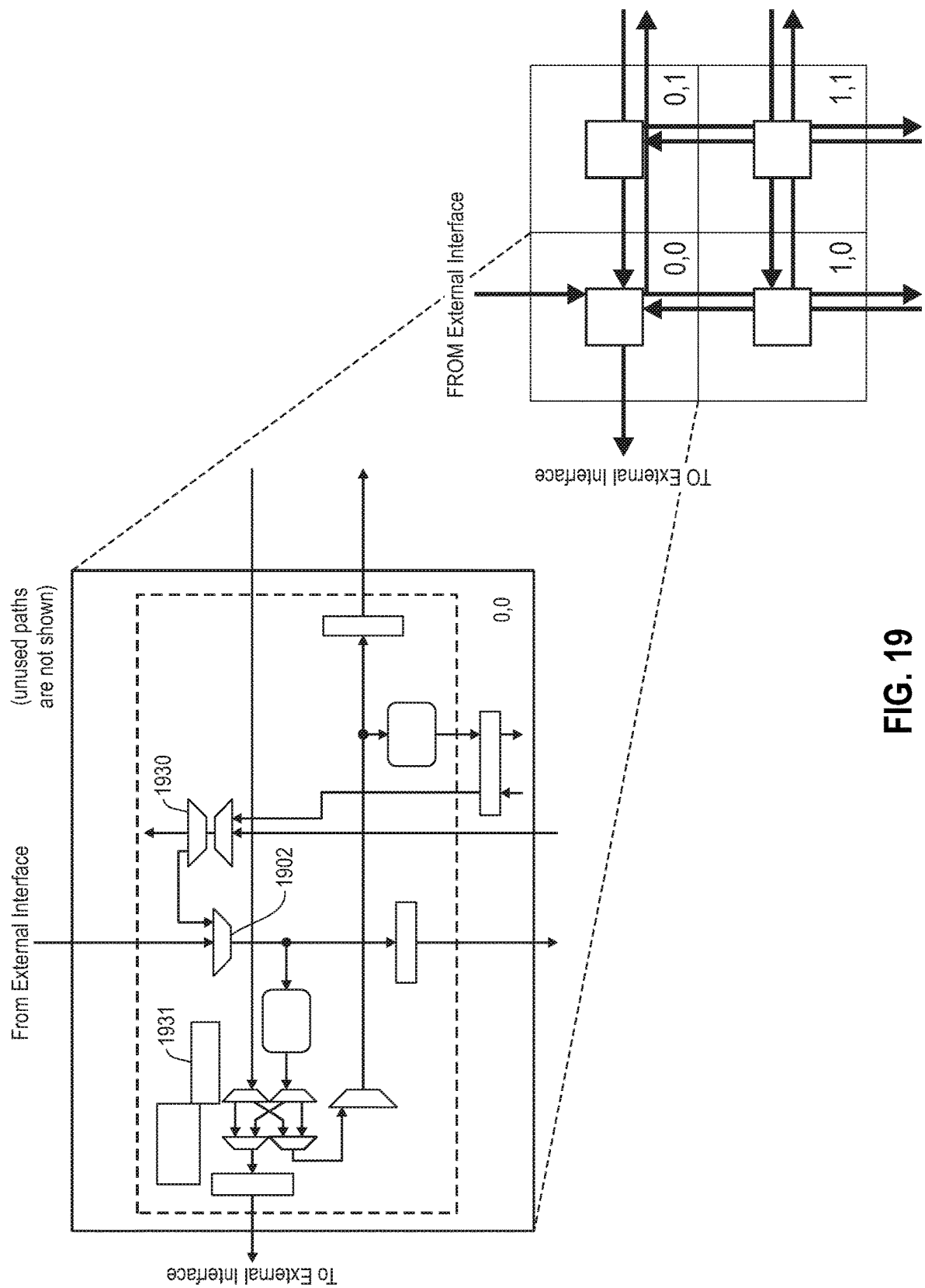
FIG. 19 is a schematic view of a model network-on-chip (NOC) external interface, according to embodiments of the present disclosure.

FIG. 19 depicts an exemplary external interface for a model network-on-chip, in accordance with the present disclosure. In this exemplary embodiment show, the Core (0,0) configuration can be set so that Split N 1930 and Split Wa,b 1931 are set to loopback. For data traveling from the External Interface:

Set "ext_in_transaction"=='1'

Dynamic merge 2 1902 will pass external data packet through, or loopback data packets from north-bound path.

SplitWa,b will loopback ext_in_transactions to east-bound path.

For data traveling to External Interface:

if "ext_out_transaction"=='1', data packet will go out TX_West to external interface, and NOT be looped back by SplitWa,b.

Although this exemplary embodiment depicts data as being delivered from the west side of the core, alternative configurations can be constructed, if so desired.

Figure 20:
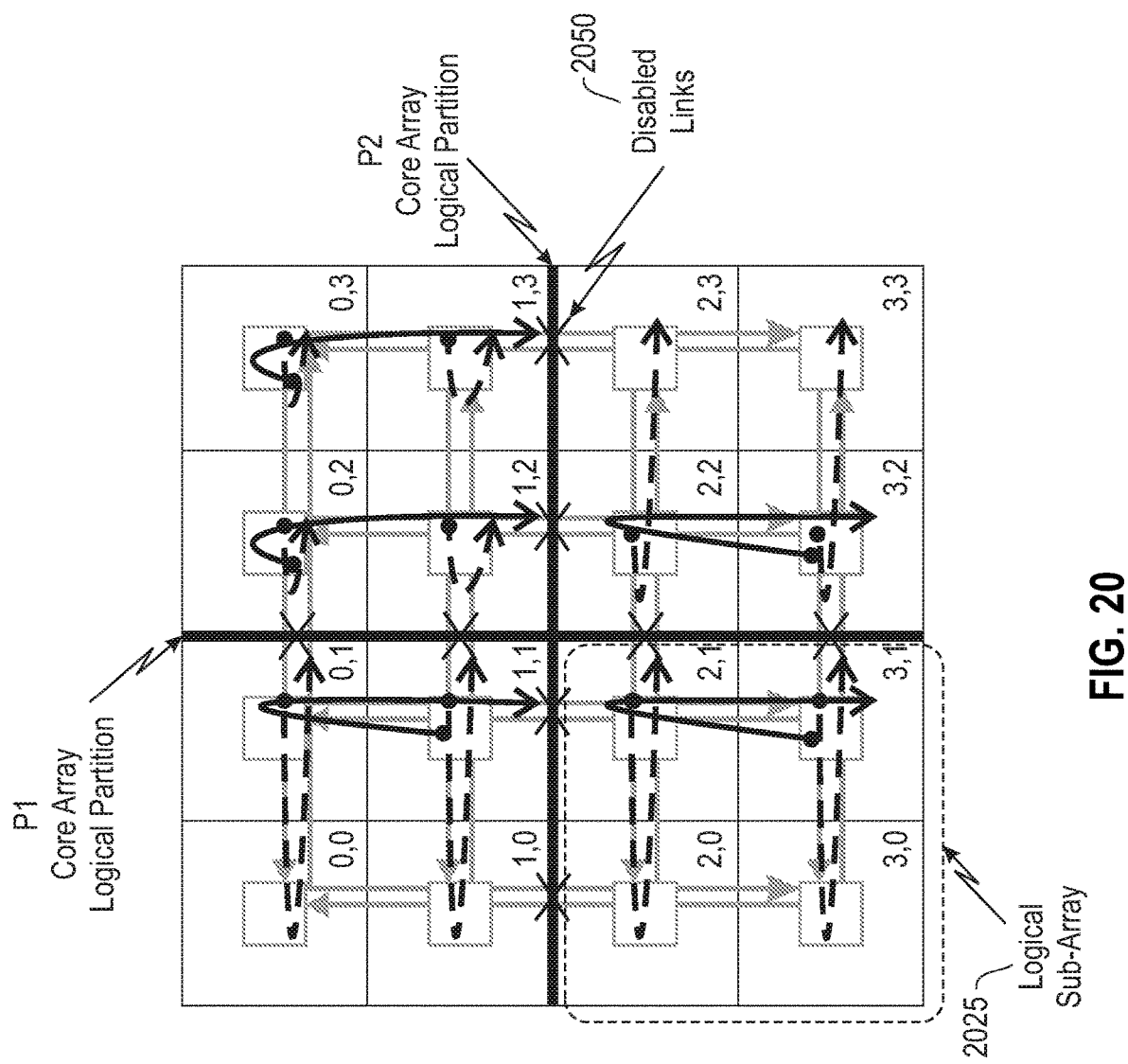
Figure 21B:
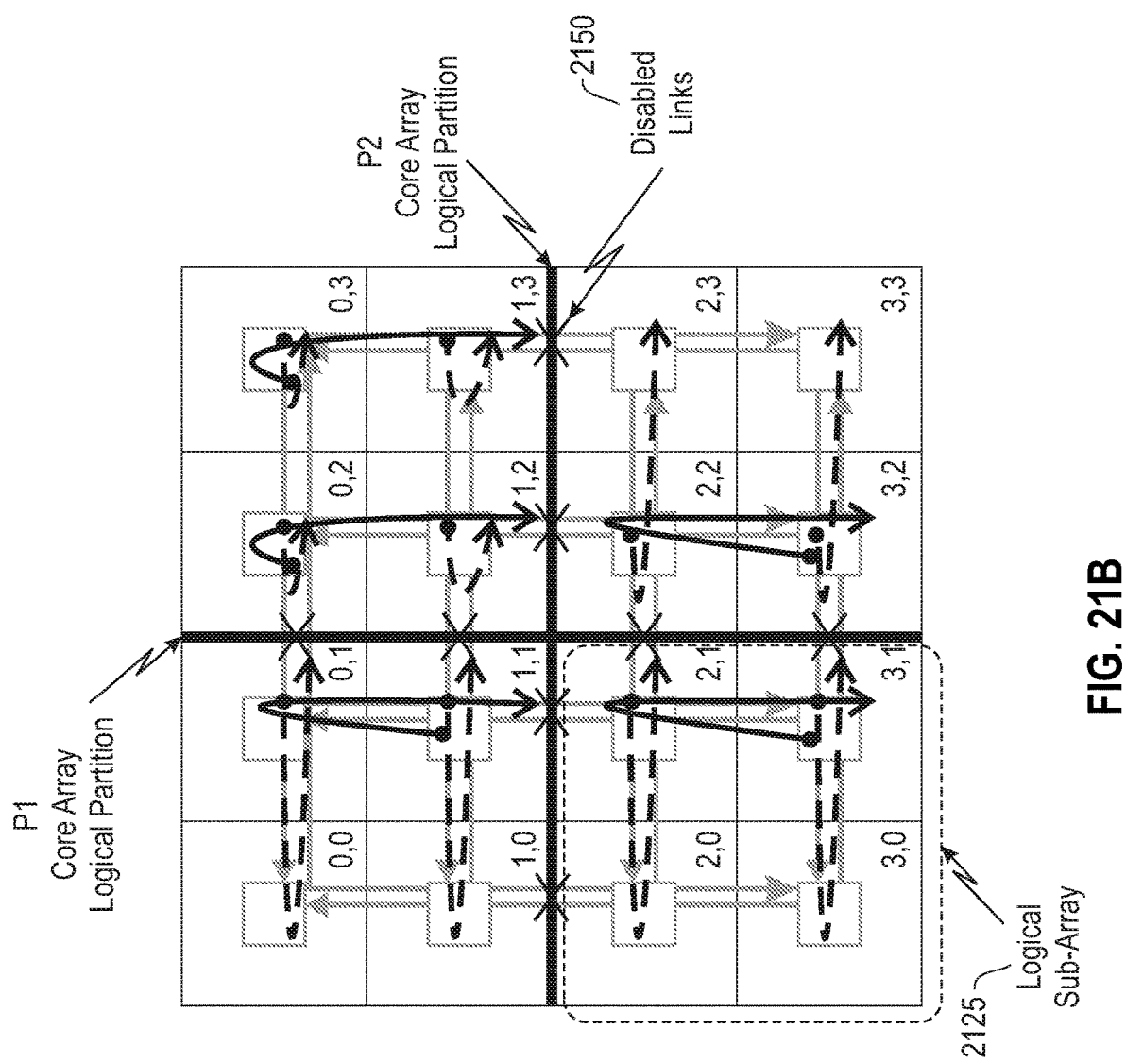

FIG. 20 depicts an exemplary array logical partitioning for a model network-on-chip, in accordance with the present disclosure. The partition is shown by lines P1 and P2 which intersect at the middle of the array of cores, such that data propagates within any given subarray until the edge of that sub-array (rather than the edge of the entire core) before lopping back in the J-scheme flow pattern. In this exemplary embodiment, array logical partitioning is achieved by using both the link disable, identified at 2050, and the loopback signals at the partition boundaries. In terms of routing protocol, each logical sub-array should operate as if it were an independent full array. Thus, each sub-array J-scheme is independent, and therefore, they may have different patterns. A link disable definition can be implemented such that each directional interface {N,S,E,W} has a disable signal, used to partition the array. Also, exemplary link operation based on link disable and loopback settings for both data transactions, and external transactions, are enumerated in FIG. 21. When "zero", all signals (addr_valid, addr, data_valid, data, etc.) are set to zero, however, "ext_in_transactions" are still injected into the upper left, and can reach any core in the array. Although the logical sub-array 2025 shown in FIG. 20 is depicted as a square including four cores, alternative size/shape sub-arrays (e.g. rectangular) can be implemented, if so desired.

Figure 22:
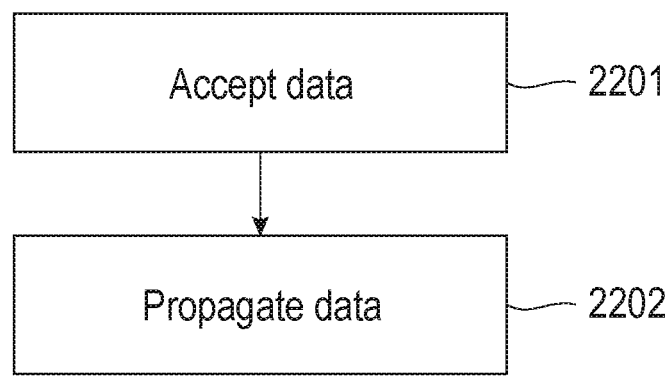
FIG. 22 illustrates a method for computing neural activations according to embodiments of the present disclosure.

Referring to FIG. 22, a method for computing neural activations is illustrated. At 2201, data are accepted at a plurality of network nodes. The plurality of network nodes is interconnected by a network on chip. The network comprises at least one pair of directional paths. The paths of each pair have opposite directions and a common end. At 2202, data are propagated along a first of the pair of directional paths from a source node to the common end of the pair of directional paths and along a second of the pair of directional paths from the common end of the pair of directional paths to one or more destination nodes.

Various embodiments of the present disclosure use combinations of instruction buffers, horizontal buffers, vertical buffers, and layover buffers to provide instruction and data distribution in one or two dimensional memory arrays. It will be appreciated that the present disclosure is applicable to higher dimensional arrays with the addition of additional buffers. In these embodiments, the time from instruction issuance to data output from the data array is constant, even though each phase may take different amounts of time. Columns may be accessed in a random order. In cases with higher than one dimension, two instructions that access the same column should be separated by a vertical distribution time. In the one dimensional case, the vertical distribution time is zero, so there is no constraint.

In various embodiments, a system is provided that includes a memory array, instruction buffers, and horizontal data buffers. The sum of the number of cycles for instruction distribution and for memory distribution is constant for all instructions.

In various embodiments, a two-dimensional memory array is provided. Horizontal buffers are provided for each row of the memory array. Vertical buffers are provided for each column of the memory array. The sum of the number of cycles for instruction distribution, for the data distribution along the vertical buffers and for data distribution along the horizontal buffers is constant.

In various embodiments, a two-dimensional memory array is provided. Layover buffers are provided for each position in the memory array. The sum of the number of cycles for instruction distribution, for the data distribution along the vertical buffers, for data distribution along the horizontal buffers, and for data transit of the layover buffers is constant.

Figure 23:
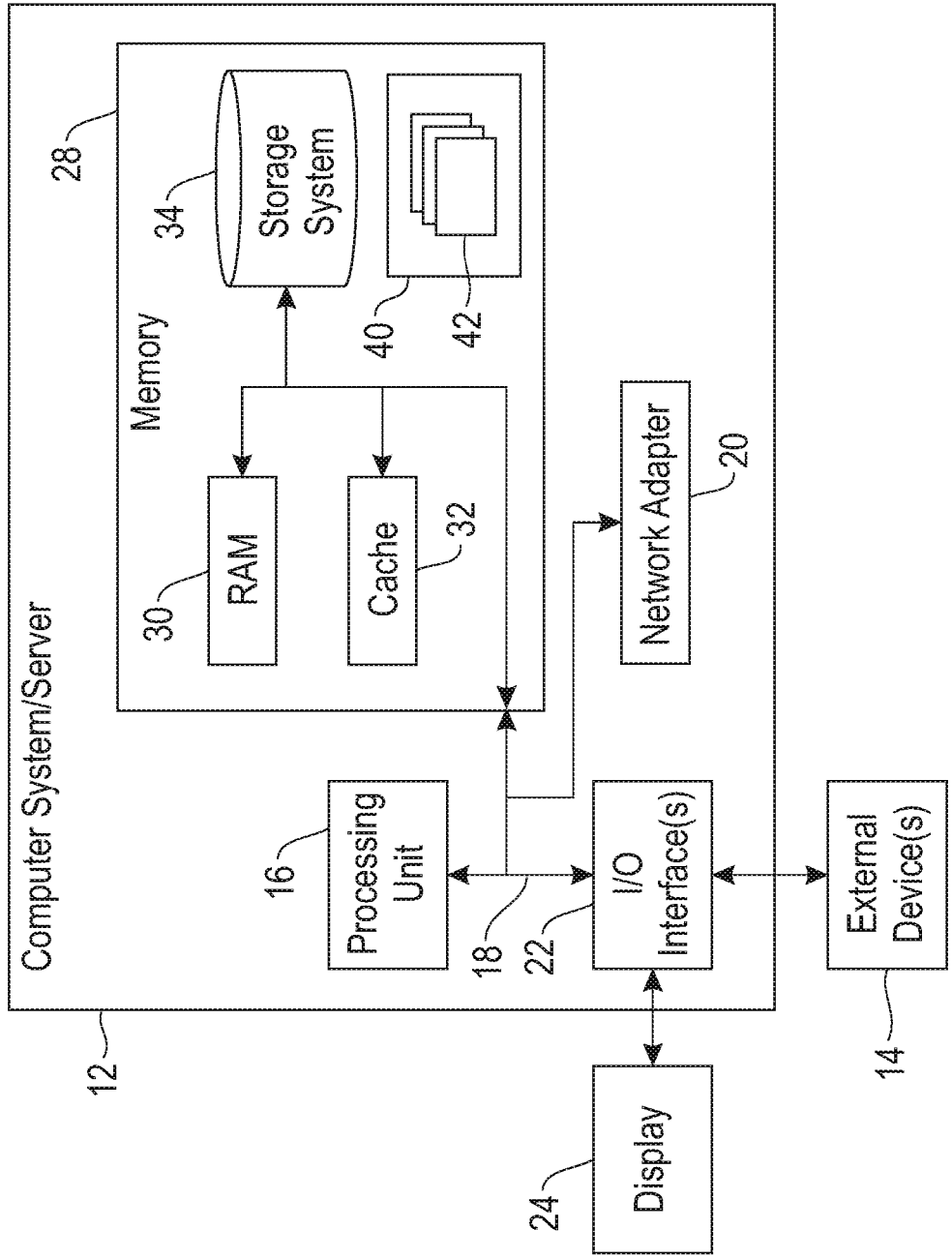
FIG. 23 depicts a computing node according to an embodiment of the present disclosure.

Referring now to FIG. 23, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 23, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural inference chip comprising:
a plurality of network nodes organized into a grid of two or more dimensions with at least one row and at least one column;
a network on chip interconnecting the plurality of network nodes, the network comprising a pair of directional paths for each row and a pair of directional paths for each column, the paths of each pair having opposite directions and a common end, the common end of each pair of directional paths being disposed at an end of the grid, wherein
the network is configured to accept data at any of the plurality of nodes,
the network is configured to propagate the data along a first of a pair of directional paths from a source node to the common end of the pair of directional paths, the first of the pair of directional paths traversing a subset of the plurality of network nodes, and
the network is configured to propagate the data along a second of the pair of directional paths from the common end of the pair of directional paths to one or more destination nodes responsive to the data being propagated along the first of the pair of directional paths to the common end, the second of the pair of directional paths traversing the subset of the plurality of network nodes.

2. The neural inference chip of claim 1, wherein the network is configured to deliver data to the one or more destination node on a second one of the pair of directional paths, according to a network address.

3. The neural inference chip of claim 1, wherein each network node comprises a router interconnecting a row network and a column of that network node.

4. The neural inference chip of claim 1, wherein the two or more dimensions are ordered such that for each dimension, data propagates along each of its pair of directional paths followed by a subsequent dimension.

5. The neural inference chip of claim 4, wherein each network node comprises a router interconnecting the pair of directional paths of each dimension with the pair of directional paths of the subsequent dimension, the router adapted to deliver data from the second of the pair of directional paths to the first of the pair of directional paths of the subsequent dimension.

6. The neural inference chip of claim 1, further comprising a router at the common end of each pair of directional paths, the router configured to receive data along a first of the pair of directional paths and send data along a second of the pair of directional paths.

7. The neural inference chip of claim 1, wherein the common end of each pair is configurable at runtime.

8. The neural inference chip of claim 7, wherein the network is partitioned into a plurality of subpartitions, each subpartition operating as an independent network on a subset of the network nodes.

9. The neural inference chip of claim 1, wherein the network is configured to accept one packet of data per node per clock cycle, and to propagate data to an adjacent node along each directional path per clock cycle.

10. The neural inference chip of claim 9, wherein the network is configured to propagate data between adjacent network nodes at every clock cycle without stopping or stalling.

11. The neural inference chip of claim 1, wherein the network is configured to deliver data by broadcast to all nodes on the second directional path.

12. The neural inference chip of claim 1, wherein the network is configured to deliver data by multicast to a subset of nodes on the second directional path.

13. The neural inference chip of claim 1, wherein the network is configured to deliver data by unicast to a single node on the second directional path.

14. The neural inference chip of claim 1, further comprising an external interface adapted to send and receive data from sources and destinations other than the network nodes.

15. The neural inference chip of claim 14, wherein the node routers or common end routers are configured to route data bound to the external interface.

16. A method comprising:
    accepting data at a plurality of network nodes, the plurality of network nodes being organized into a grid of two or more dimensions with at least one row and at least one column, the plurality of network nodes being interconnected by a network on chip, the network comprising a pair of directional paths for each row and a pair of directional paths for each column, the paths of each pair having opposite directions and a common end, the common end of each pair of directional paths being disposed at an end of the grid;
    propagating data along a first of a pair of directional paths from a source node to the common end of the pair of directional paths, the first of the pair of directional paths traversing a subset of the plurality of network nodes; and
    propagating, responsive to the data being propagated along the first of the pair of directional paths to the common end, the data along a second of the pair of directional paths from the common end of the pair of directional paths to one or more destination nodes, the second of the pair of directional paths traversing the subset of the plurality of network nodes.

17. The method of claim 16, further comprising:
    propagating multiple adjacent pieces of data over the network on chip, wherein a plurality of source nodes inject data onto the network in a given cycle.

18. The method of claim 16, further comprising:
    propagating multiple adjacent pieces of data over the network on chip, wherein a plurality of source nodes inject data onto the network such that the data is interleaved on the network.

19. The method of claim 16, further comprising:
    propagating multiple adjacent pieces of data over the network on chip, wherein a plurality of source nodes inject data onto different networks of a first dimension such that the data is later interleaved on a network of a second dimension.

20. The method of claim 16, wherein the injection of data onto the network from one or more source nodes proceeds according to a predetermined schedule.

21. The method of claim 20, wherein the predetermined schedule ensures that data collisions do not occur on the one or more networks.

* * * * *